United States Patent
Suzuki

(10) Patent No.: US 7,086,392 B2
(45) Date of Patent: Aug. 8, 2006

(54) CONTROL APPARATUS FOR SEALED FUEL TANK SYSTEM

(75) Inventor: Naoto Suzuki, Fujinomiya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 14 days.

(21) Appl. No.: 10/946,607

(22) Filed: Sep. 22, 2004

(65) Prior Publication Data
US 2005/0066949 A1    Mar. 31, 2005

(30) Foreign Application Priority Data
Sep. 29, 2003    (JP)    ............... 2003-338537

(51) Int. Cl.
*F02D 41/04* (2006.01)
(52) U.S. Cl. ............ 123/698; 123/399; 123/516; 123/520
(58) Field of Classification Search ............ 123/399, 123/516, 520, 521, 698
See application file for complete search history.

(56) References Cited

U.S. PATENT DOCUMENTS

| | | | |
|---|---|---|---|
| 5,947,097 A * | 9/1999 | Harada ............... | 123/399 |
| 6,305,757 B1 * | 10/2001 | Ohsaki et al. ............ | 303/114.3 |
| 6,412,455 B1 * | 7/2002 | Ogiso et al. ............... | 123/399 |
| 6,575,146 B1 | 6/2003 | Kanai et al. | |
| 6,679,230 B1 | 1/2004 | Kanai et al. | |
| 6,769,419 B1 | 8/2004 | Kanai et al. | |
| 6,866,020 B1 * | 3/2005 | Allston et al. ............. | 123/520 |

FOREIGN PATENT DOCUMENTS

| | | |
|---|---|---|
| JP | 08-317507 | 11/1996 |
| JP | 10-299582 | 11/1998 |
| JP | 10-331727 | 12/1998 |
| JP | 2001-295689 | 10/2001 |

* cited by examiner

*Primary Examiner*—Erick R Solis
(74) *Attorney, Agent, or Firm*—Kenyon & Kenyon LLP

(57) ABSTRACT

A control apparatus is provided for a sealed fuel tank system which is applied to an engine including a throttle valve provided in an intake pipe, and which includes a vaporized fuel supply pipe that connects a fuel tank and the intake pipe, and a control valve that opens and closes the vaporized fuel supply pipe. The control apparatus includes a controller which maintains the control valve in an open state on the condition that a pressure in the fuel tank is equal to or higher than a reference determination pressure; and corrects an opening amount of the throttle valve to a value equal to a first control opening amount that is smaller than a required opening amount set based on an operating state of the engine by a first correction opening amount when the control valve is in the open state.

22 Claims, 14 Drawing Sheets

FIG.5

<DUTY RATIO CALCULATION MAP>

| | TANK PRESSURE Pt (KPa) | | | | |
|---|---|---|---|---|---|
| | 1 | 5 | 10 | 15 | ... |
| FLOW AMOUNT OF FLOW GAS Qpg (g/s) 0.1 | Dt11 | Dt12 | Dt13 | Dt14 | ... |
| 0.2 | Dt21 | Dt22 | Dt23 | Dt24 | ... |
| 0.3 | Dt31 | Dt32 | Dt33 | Dt34 | ... |
| 0.4 | Dt41 | Dt42 | Dt43 | Dt44 | ... |
| ... | ... | ... | ... | ... | ... |

<CORRECTION OPENING AMOUNT CALCULATION MAP (1)>

<CORRECTION OPENING AMOUNT CALCULATION MAP (2)>

<COMPENSATION OUTPUT CALCULATION MAP>

<DRIVING VOLTAGE CALCULATION MAP>

<CORRECTION OPENING AMOUNT CALCULATION MAP (3)>

<CORRECTION OPENING AMOUNT CALCULATION MAP (4)>

<CORRECTION OPENING AMOUNT CALCULATION MAP (5)>

<CORRECTION OPENING AMOUNT CALCULATION MAP (6)>

CONTROL APPARATUS FOR SEALED FUEL TANK SYSTEM

The disclosure of Japanese Patent Applications No. 2003-338537 filed on Sep. 29, 2003 including the specification, drawings and abstract is incorporated herein by reference in its entirety.

BACKGROUND OF THE INVENTION

1. Field of the Invention

The invention relates to a control apparatus for a sealed fuel tank system which supplies vaporized fuel in a fuel tank to an engine.

2. Description of the Related Art

A sealed fuel tank system has a function for purging vaporized fuel (i.e., vapor) generated in a fuel tank without causing the vapor to leak to the atmosphere in a vehicle in which volatile fuel such as gasoline is supplied to the engine.

The sealed fuel tank system mainly includes a fuel tank which stores fuel in a sealed state, a vaporized fuel supply pipe which discharges (purges) vapor generated in the fuel tank to an intake pipe of an engine, and a control valve which opens and closes the vaporized fuel supply pipe.

In the sealed fuel tank system, when a pressure in the fuel tank (hereinafter, referred to as "tank pressure") is equal to or higher than a target value, the control valve is maintained in an open state, whereby air containing the vapor is discharged from the fuel tank to the intake pipe using an intake vacuum pressure in the engine.

Meanwhile, in the aforementioned sealed fuel tank system, when an absolute value of the intake vacuum pressure in the engine which is applied to the fuel tank is low, the flow amount of the vapor discharged from the fuel tank to the intake pipe is reduced, and accordingly the pressure in the fuel tank may not be reduced to a target value.

An example of a conventional sealed fuel tank system is disclosed in Japanese Patent Laid-Open Publication No. 10-299582. In the sealed fuel tank system, a vacuum pressure chamber is provided in a vaporized fuel supply pipe, and vapor is purged through the vacuum pressure chamber when an absolute value of an intake vacuum pressure is low.

In this configuration, since the vacuum pressure chamber needs to be further provided in an existing sealed fuel tank system, the size of the system may become large, and the configuration of the system may become complicated.

SUMMARY OF THE INVENTION

In view of the above, a control apparatus for a sealed fuel tank system is provided, which can improve ability to purge vapor using a hardware configuration of an existing sealed fuel tank system as much as possible.

The invention relates to a control apparatus for a sealed fuel tank system which is applied to an engine including a throttle valve provided in an intake pipe, and which includes a vaporized fuel supply pipe that connects a fuel tank and the intake pipe, and a control valve that opens and closes the vaporized fuel supply pipe. The control apparatus for a sealed fuel tank system further includes a controller which maintains the control valve in an open state on the condition that a pressure in the fuel tank is equal to or higher than a reference determination pressure; and corrects an opening amount of the throttle valve to a value equal to a first control opening amount that is smaller than a required opening amount set based on an operating state of the engine by a first correction opening amount when the control valve is in the open state.

In the control apparatus for a sealed fuel tank system having the aforementioned configuration, when the control valve is in the open state, the opening amount of the throttle valve is corrected to the value equal to the first control opening amount that is smaller than the required opening amount set based on the operating state of the engine by the first correction opening amount. Thus, since a vacuum pressure in the intake pipe (intake vacuum pressure) is increased (that is, an absolute value of the vacuum pressure in the intake pipe is increased), a difference between the pressure in the fuel tank (tank pressure) and the pressure in the intake pipe is increased. Accordingly, since a flow amount of vapor discharged from the fuel tank to the intake pipe is increased, a speed at which the tank pressure is reduced is increased. In the aforementioned configuration, since the intake vacuum pressure is actively increased by correcting the opening amount of the throttle valve when the tank pressure is reduced, the ability to purge the vapor can be improved. Also, the sealed fuel tank system can be configured using the hardware configuration of the existing sealed fuel tank system as much as possible.

BRIEF DESCRIPTION OF THE DRAWINGS

The above mentioned and other objects, features, advantages, technical and industrial significances of this invention will be better understood by reading the following detailed description of exemplary embodiments of the invention, when considered in connection with the accompanying drawings, in which:

FIG. 5 is a duty ratio calculation map which is used in the tank pressure adjustment routine in the first embodiment;

DETAILED DESCRIPTION OF THE PREFERRED EMBODIMENTS

In the following description and the accompanying drawings, the present invention will be described in more detail with reference to exemplary embodiments.

Figure 1:
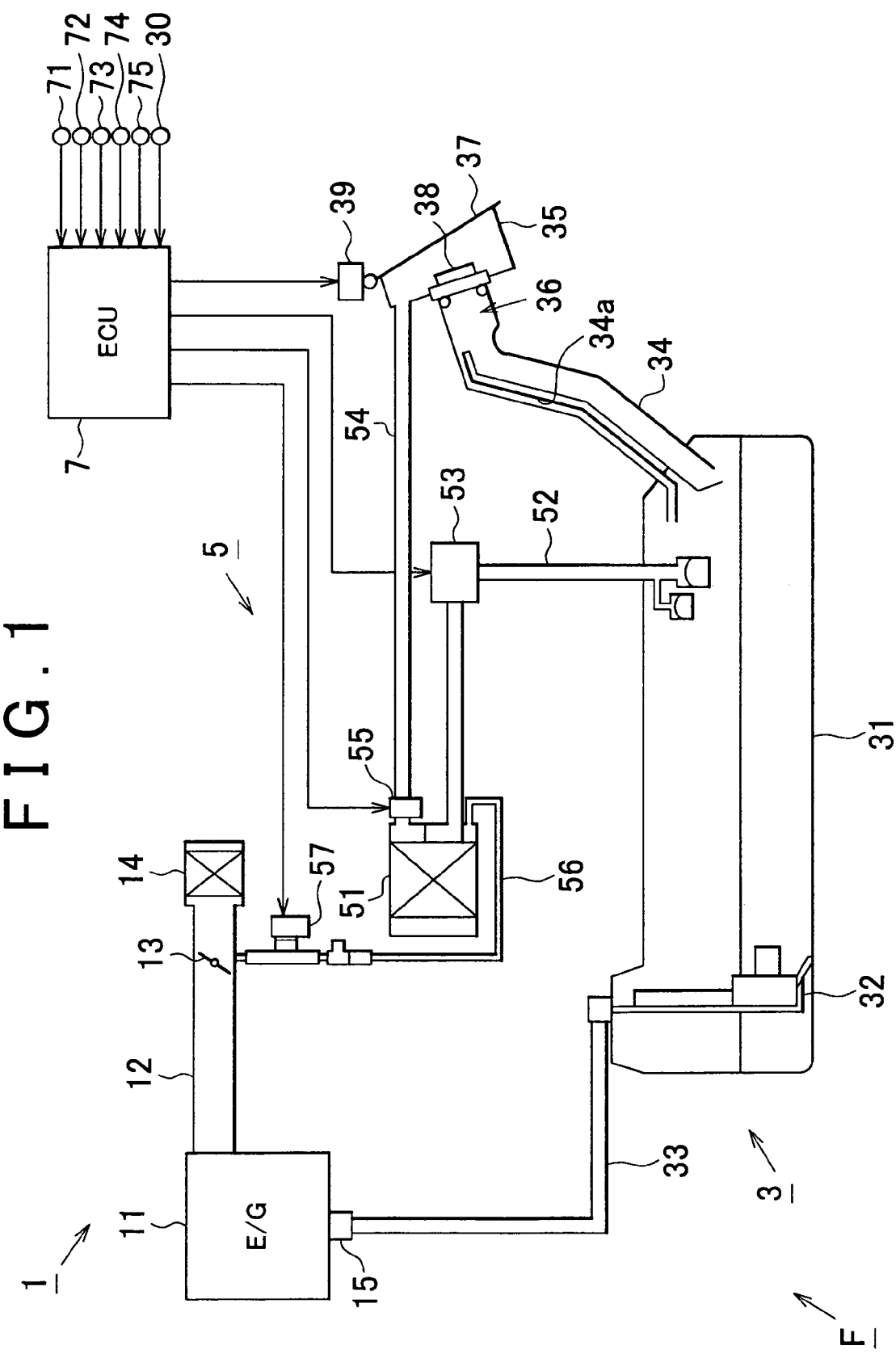
FIG. 1 is a schematic diagram showing an entire configuration of a control apparatus for a sealed fuel tank system according to a first embodiment of the invention.

A first embodiment of the invention will be described with reference to FIG. 1 to FIG. 8. FIG. 1 shows a configuration of a vehicle including a sealed fuel tank system F.

The vehicle includes elements described in the following (a) to (d).
(a) an engine 1 which generates power through combustion of an air-fuel mixture;
(b) a fuel supply device 3 which supplies fuel to the engine 1;
(c) a vapor purging device 5 which discharges (purges) vaporized fuel (vapor) generated in the fuel supply device 3 to an intake pipe of the engine 1; and
(d) an electronic control unit (ECU) 7 which controls the vehicle including the engine 1, the fuel supply device 3, and the vapor purging device 5.

The sealed fuel tank system F according to the embodiment includes the fuel supply device 3, the vapor purging device 5, and the ECU 7.

A configuration of the engine 1 will be described. An engine main body 11 generates power through combustion of the air-fuel mixture. An intake pipe 12 supplies outside air to the engine main body 11. A throttle valve 13 adjusts an amount of intake air supplied to the engine main body 11. An opening amount of the throttle valve 13 is controlled based on an accelerator operation amount of the vehicle and the like.

An air cleaner 14 removes foreign matter from the air taken to the intake pipe 12. An injector 15 injects the fuel supplied from the fuel supply device 3 into the engine main body 11. A command value indicating a fuel injection amount given to the injector 15 is set based on the opening amount of the throttle valve 13 and the like.

A configuration of the fuel supply device 3 will be described. A pressure-resistance tank 31 (fuel tank) stores the fuel in a sealed state. A fuel pump 32 pressurizes and delivers the fuel in the pressure-resistance tank 31 to the engine main body 11. The fuel pressurized by the fuel pump 32 flows to the engine main body 11 through a fuel supply pipe 33.

A refueling pipe 34 connects the pressure-resistance tank 31 and a fuel inlet box 35. The refueling pipe 34 has a refueling port 36 at an end portion on the fuel inlet box 35 side. A communication pipe 34a connects the pressure-resistance tank 31 and the refueling port 36. The fuel inlet box 35 has a lid 37 for opening/closing the refueling port 36 to the outside of the vehicle. The lid 37 is driven to be opened/closed through a lid actuator 39.

The refueling port cap 38 closes the refueling port 36. The lid actuator 39 drives the lid 37 according to operation of a lid switch 30. The lid switch 30 can be turned on and off through operation by a driver or the like.

The ECU 7 opens the lid 37 by controlling the lid actuator 39 when the lid switch 30 is turned on. Meanwhile, the ECU 7 closes the lid 37 by controlling the lid actuator 39 when the lid switch 30 is turned off.

A configuration of the vapor purging device 5 will be described. A canister 51 has an adsorbent (for example, active carbon) therein, and temporarily captures vapor generated in the pressure-resistance tank 31 by adsorbing the vapor using the adsorbent.

A first vapor pipe 52 connects an upper portion of the pressure-resistance tank 31 and the canister 51. Also, the first vapor pipe 52 has a blockade valve (control valve) 53. The blockade valve 53 opens and closes the first vapor pipe 52.

As the blockade valve 53, an electromagnetic valve is employed, which is opened when energized, and is closed when non-energized. An opening amount of the blockade valve 53 is changed according to a duty ratio. The blockade valve 53 is controlled through the ECU 7. Basically, the blockade valve 53 is maintained in a closed state (non-energized state).

An outside air introduction pipe 54 connects the canister 51 and the fuel inlet box 35 (in the atmosphere). The outside air introduction pipe 54 has an outside air control valve 55. The outside air control valve 55 opens and closes the outside air introduction pipe 54. As the outside air control valve 55, an electromagnetic valve whose opening/closing can be controlled through the ECU 7 is employed.

A second vapor pipe 56 connects the canister 51 and the intake pipe 12. Also, the second vapor pipe 56 has a purge control valve 57. The purge control valve 57 opens/closes the second vapor pipe 56. As the purge control valve 57, an electromagnetic valve whose opening/closing can be controlled through the ECU 7 is employed.

In the sealed fuel tank system F according to the embodiment of the invention, the first vapor pipe 52 and the second vapor pipe 56 correspond to the vaporized fuel supply pipe. Also, the controller is configured so as to include the ECU 7.

Each of sensors constituting a detecting system of the vehicle will be described. An engine coolant temperature sensor 71 detects a temperature of coolant of the engine 1 (engine coolant temperature). A value detected by the engine coolant temperature sensor 71 is input to the ECU 7 as an engine coolant temperature THw.

An engine speed sensor 72 detects a rotational speed of a crankshaft of the engine 1 (engine speed). A value detected by the engine speed sensor 72 is input to the ECU 7 as an engine speed Ne.

A throttle sensor 73 detects an opening amount of the throttle valve 13 (throttle opening amount). A value detected by the throttle sensor 73 is input to the ECU 7 as a throttle opening amount Tv. A tank pressure sensor 74 detects pressure in the pressure-resistance tank 31 (tank pressure). A value detected by the tank pressure sensor 74 is input to the ECU 7 as a tank pressure Pt.

An air-fuel ratio sensor 75 detects an oxygen concentration in the exhaust gas. A value detected by the air-fuel ratio sensor 75 is input to the ECU 7 as an oxygen concentration Op.

In the engine 1, air-fuel ratio control is performed in the manner described below.
(a) The air-fuel ratio is calculated based on the oxygen concentration Op.
(b) A correction coefficient for a command value indicating a fuel injection amount (feedback correction coefficient FAF) is calculated based on the air-fuel ratio as follows.
(c) When the air-fuel ratio is in a rich side region, the feedback correction coefficient FAF is made smaller than 1 (reference value) so that the air-fuel ratio enters a window region.
(d) When the air-fuel ratio is in a lean side region, the feedback correction coefficient FAF is made larger than 1 so that the air-fuel ratio enters the window region.

Fuel supply in the sealed fuel tank system F will be described. When the lid switch 30 is turned on before fuel supply, the lid 37 and the blockade valve 53 are opened on the condition that the tank pressure Pt is lower than a first determination pressure PtX1 (reference determination pressure).

When the tank pressure Pt is equal to or higher than the first determination pressure PtX1, only the blockade valve 53 is opened. The lid 37 is maintained in the closed state until the tank pressure Pt becomes lower than the first determination pressure PtX1.

When air containing the vapor in the pressure-resistance tank 31 flows into the canister 51 through the first vapor pipe 52, the vapor is captured by the adsorbent in the canister 51. After the lid 37 is opened, the refueling port cap 38 is removed, and then fuel supply is started.

The blockade valve 53 is maintained in the open state during fuel supply, whereby an excess increase in the tank pressure is prevented during fuel supply.

Driving of the vapor purging device will be described. In the vapor purging device 5, "purging" and "tank pressure adjustment" are performed in the manner described below.

Operation of purging will be described. When a condition for performing purging is satisfied (for example, when the engine coolant temperature THw is equal to or higher than a predetermined temperature) during operation of the engine 1, the purge control valve 57 is opened.

Thus, since the vacuum pressure in the intake pipe 12 (intake vacuum pressure) is applied to the vapor purging device 5, the air containing the vapor in the canister 51 (purge gas) is purged to the intake pipe 12 through the second vapor pipe 56.

The outside air control valve 55 is opened together with purge control valve 57. Thus, the outside air is supplied to the canister 51 through the outside air introduction pipe 54, and the vapor adsorbed in the canister 51 is purged to the intake pipe 12 together with the outside air flowing into the canister 51.

While purging is performed, the command value indicating the fuel injection amount given to the injector 15 is corrected considering the influence of purging on the air-fuel ratio. Adjustment of the pressure in the pressure-resistance tank 31 will be described.

When it is detected that the tank pressure Pt is equal to or higher than the first determination pressure PtX1, the blockade valve 53 is opened. That is, in the vapor purging device 5, the blockade valve 53 is controlled to be opened in coordination with the purge control valve 57.

Thus, the air containing the vapor in the pressure-resistance tank 31 is purged through the first vapor pipe 52, the canister 51, and the second vapor pipe 56. Meanwhile, with regard to the aforementioned sealed fuel tank system F, there is a concern described below.

In the case where a difference between the pressure in the intake pipe 12 and the pressure in the pressure-resistance tank 31 is small, since the flow amount of the purge gas purged to the intake pipe 12 decreases, the tank pressure may not be sufficiently reduced. That is, the tank pressure Pt may not be reduced to a value lower than the first determination pressure PtX1.

In this case, even if the lid switch 30 is turned on before fuel supply, operation of fuel supply may take a long time since fuel cannot be supplied to the pressure-resistance tank 31 until the tank pressure Pt becomes lower than the first determination pressure PtX1.

Accordingly, considering this concern, the adjustment of the pressure in the pressure-resistance tank 31 is performed through "the tank pressure adjustment routine" described below in the embodiment of the invention. Hereinafter, "the tank pressure adjustment routine" will be described together with "the purging routine" for performing purging using the vapor purging device 5.

Figure 2:
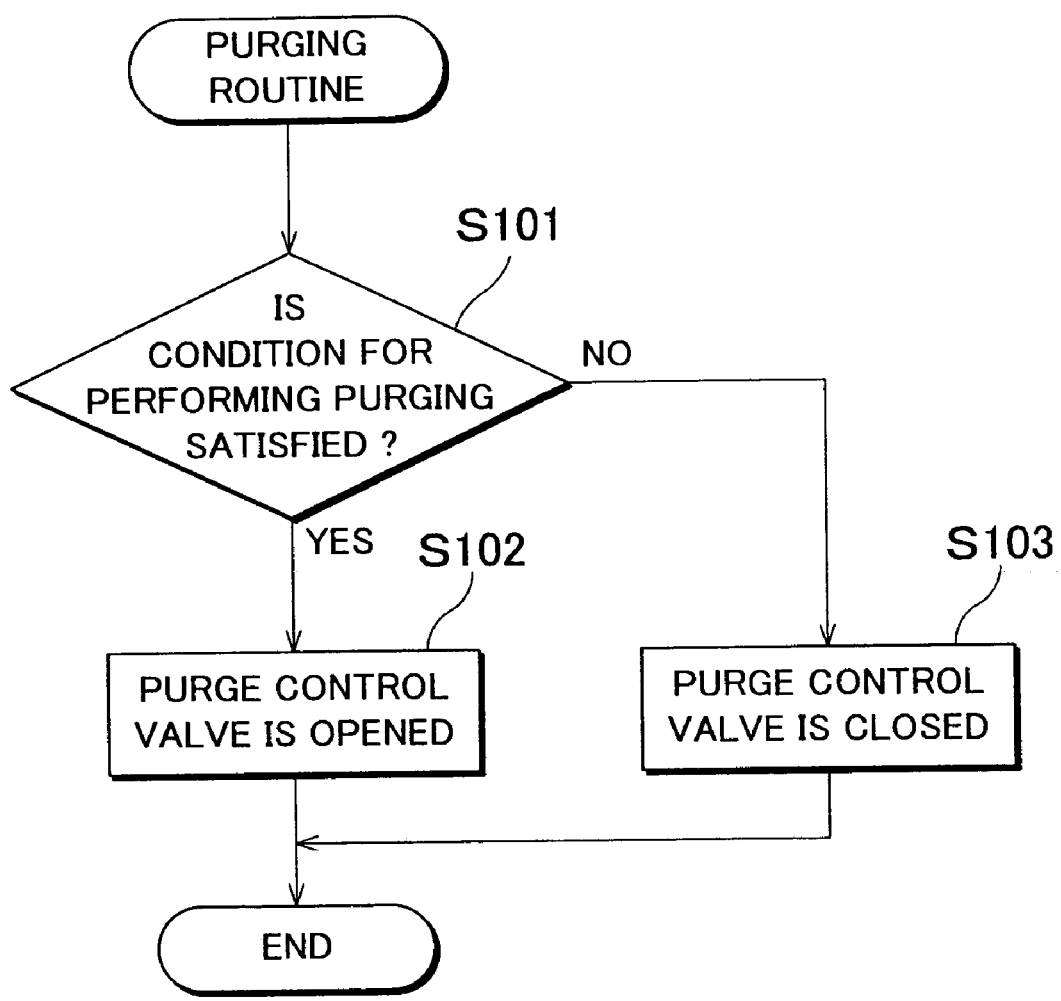
FIG. 2 is a flow chart showing a purging routine performed in the first embodiment.

Referring to FIG. 2, "the purging routine" will be described. This routine is repeatedly performed at predetermined time intervals during operation of the engine 1.

Step S101: It is determined whether the condition for performing purging is satisfied. For example, a condition that the engine coolant temperature THw is equal to or higher than a predetermined coolant temperature THwX can be used as the condition for performing purging. When the condition for performing purging is satisfied, the routine proceeds to step S102. When the condition for performing purging is not satisfied, the routine proceeds to step S103.

Step S102: The purge control valve 57 is opened (i.e., purging is performed). The opening amount of the purge control valve 57 is set considering the influence on the air-fuel ratio.

Step S103: The purge control valve 57 is closed (i.e., purging is stopped).

Figure 3:
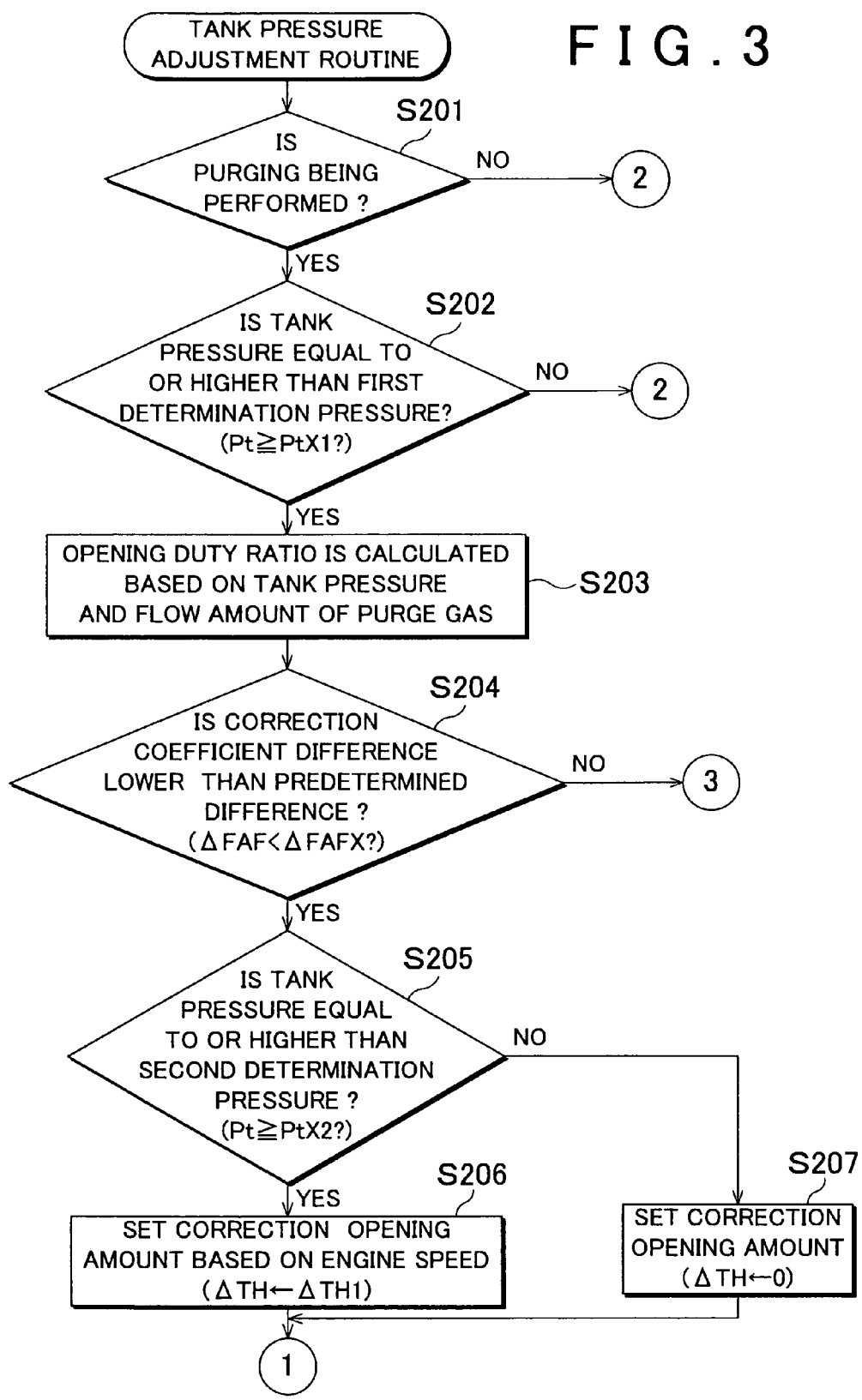
FIG. 3 is a flow chart showing a tank pressure adjustment routine performed in the first embodiment.
Figure 4:
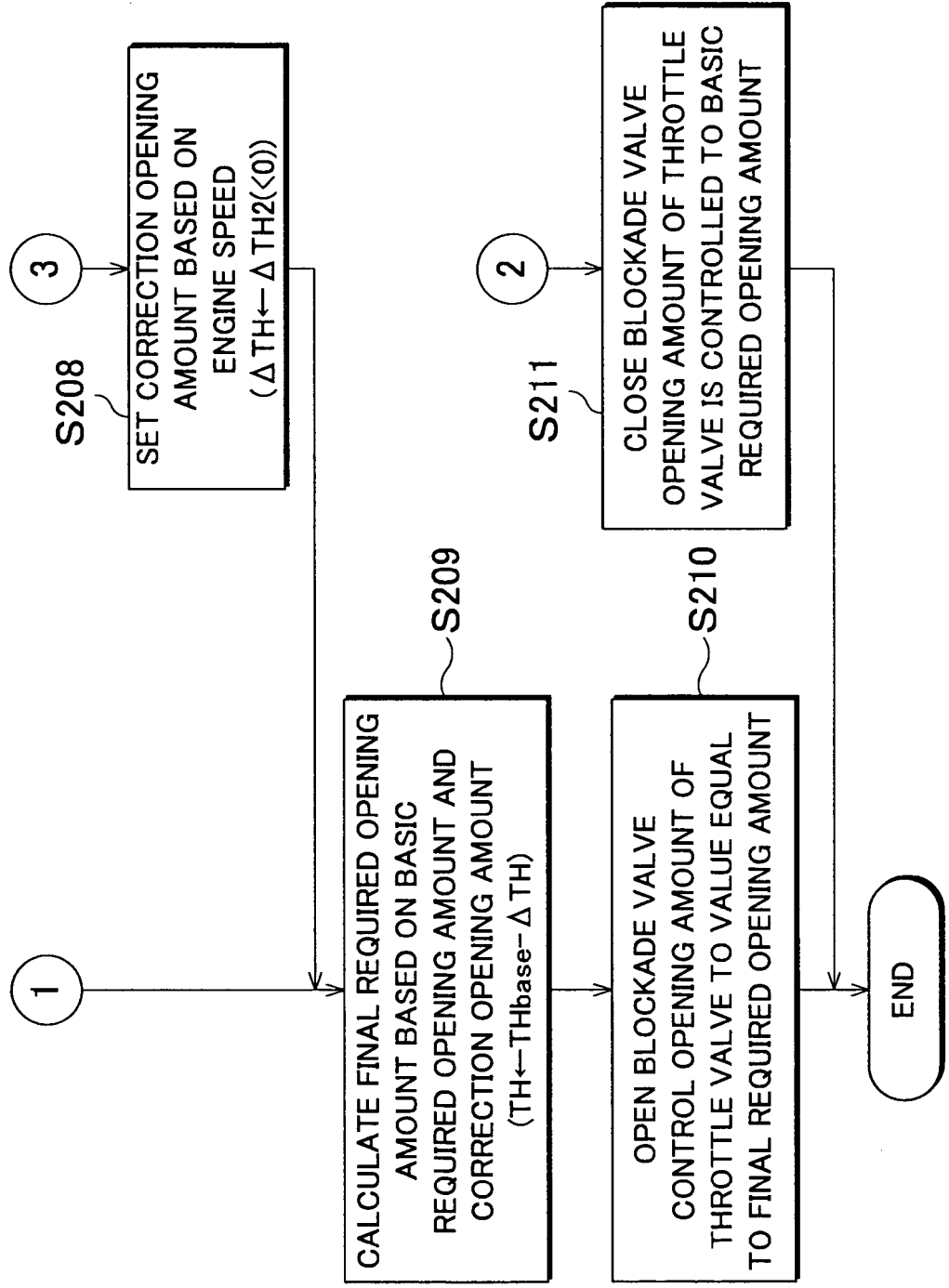
FIG. 4 is a flow chart showing a tank pressure adjustment routine performed in the first embodiment.

Referring to FIG. 3 and FIG. 4, "the tank pressure adjustment routine" will be described. The routine is repeatedly performed at predetermined time intervals during the operation of the engine 1. Also, the routine is performed in parallel with "the purging routine".

Step S201: It is determined whether purging is being performed. That is, it is determined whether the purge control valve 57 is opened. When purging is being performed, the routine proceeds to step S202. When purging is not being performed, the routine proceeds to step S211.

Step S202: It is determined whether the tank pressure Pt is equal to or higher than the first determination pressure PtX1. That is, it is determined whether the following condition is satisfied.

$$Pt \geq PtX1$$

When the tank pressure Pt is equal to or higher than the first determination pressure PtX1, the routine proceeds to step S203. When the tank pressure Pt is lower than the first determination pressure PtX1, the routine proceeds to step S211.

The first determination pressure PtX1 is equivalent to an upper limit value in the tank pressure range in which the operation of fuel supply can be performed without causing the vapor in the pressure-resistance tank 31 to leak to the atmosphere. Also, the first determination pressure PtX1 is a preset value. When the tank pressure Pt is lower than the first determination pressure PtX1, it is determined that the vapor does not leak to the atmosphere during the operation of fuel supply. Meanwhile, when the tank pressure Pt is equal to or higher than the first determination pressure PtX1, it is determined that the vapor may leak to the atmosphere during the operation of fuel supply.

The first determination pressure PtX1 is set in the manner described below.

(a) The first determination pressure PtX1 is set to a value which is equal to atmospheric pressure.
(b) The first determination pressure PtX1 is set to a value obtained by adding a predetermined margin to the atmospheric pressure (i.e., a value that is higher than the atmospheric pressure by the predetermined margin).
(c) The first determination pressure PtX1 is set to a value obtained by subtracting a predetermined margin from the atmospheric pressure (i.e., a value that is lower than the atmospheric pressure by the predetermined margin).

The first determination pressure PtX1 is set to a value smaller than an allowable maximum pressure Ptmax of the pressure-resistance tank 31.

Step S203: An opening duty ratio Dt at which the blockade valve 53 is opened is set based on the tank pressure Pt and the flow amount of the purge gas (a purge flow amount Qpg). When the opening duty ratio Dt is set to 100%, the opening amount of the blockade valve 53 is maintained at the maximum opening amount. Meanwhile, when the opening duty ratio Dt is set to 0%, the opening amount of the blockade valve 53 is maintained at 0 (i.e., the blockade valve 53 is maintained in a closed state). The opening duty ratio Dt can be calculated by applying the tank pressure Pt and the purge flow amount Qpg to a duty ratio calculation map (FIG. 5). The values of the opening duty ratio Dt in the map are set in advance through experiments and the like.

The purge flow amount Qpg can be calculated using a predetermined map defining a correspondence relation between the pressure in the intake pipe 21, the opening amount of the purge control valve 57, and the purge flow amount Qpg.

Step S204: It is determined whether an absolute value of a difference (correction coefficient difference $\Delta FAF$) between the feedback correction coefficient FAF and the reference value "1" is smaller than a predetermined difference $\Delta FAFX$. That is, it is determined whether the following condition is satisfied.

$$\Delta FAF < \Delta FAFX$$

The correction coefficient difference $\Delta FAF$ is calculated through the following process.

$$\Delta FAF \leftarrow |FAF-1|$$

When the correction coefficient difference $\Delta FAF$ is smaller than the predetermined difference $\Delta FAFX$, the routine proceeds to step S205. When the correction coefficient difference $\Delta FAF$ is equal to or larger than the predetermined difference $\Delta FAFX$, the routine proceeds to step S208.

The predetermined difference $\Delta FAFX$ is equivalent to an upper limit in a range of the correction coefficient difference $\Delta FAF$ in which emission gas is in a good state. Also, the predetermined difference $\Delta FAFX$ is a preset value. When the correction coefficient difference $\Delta FAF$ is smaller than the predetermined difference $\Delta FAFX$, it is determined that the emission gas is maintained in a good state. Meanwhile, when the correction coefficient difference $\Delta FAF$ is equal to or larger than the predetermined difference $\Delta FAFX$, it is determined that the emission gas is in a deteriorated state.

Step S205: It is determined whether the tank pressure Pt is equal to or higher than a second determination pressure PtX2 (predetermined determination pressure). That is, it is determined whether the following condition is satisfied.

$$Pt \geq PtX2$$

When the tank pressure Pt is equal to or higher than the second determination pressure PtX2, the routine proceeds to step S206. When the tank pressure Pt is lower than the second determination pressure PtX2, the routine proceeds to step S207. The second determination pressure PtX2 is equivalent to a lower limit value in the tank pressure range in which the opening amount of the throttle valve 13 needs to be corrected (i.e., the absolute value of the intake vacuum pressure needs to be increased) when the tank pressure is reduced. Also, the second determination pressure PtX2 is a preset value. The second determination pressure PtX2 is set to a value larger than the first determination pressure PtX1.

When the tank pressure Pt is equal to or higher than the second determination pressure PtX2, it is determined that it is preferable to correct the opening amount of the throttle valve 13 in order to reduce the tank pressure. Meanwhile, when the tank pressure Pt is lower than the second determination pressure PtX2, it is determined that the tank pressure can be sufficiently reduced without correcting the opening amount of the throttle valve 13.

Step S206: A correction amount (correction opening amount $\Delta TH$) of the opening amount of the throttle valve 13 is set based on the engine speed Ne in the manner described below.

Figure 6:
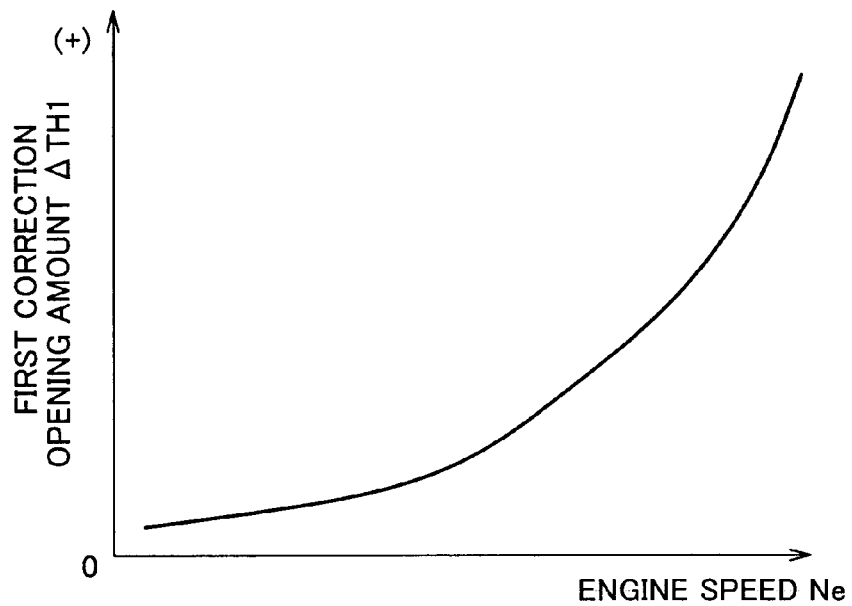
FIG. 6 is a correction opening amount calculation map (1) which is used in the tank pressure adjustment routine in the first embodiment.

(a) A first correction opening amount $\Delta TH1$ is calculated by applying the engine speed Ne to a correction opening amount calculation map (1) (FIG. 6).
(b) The correction opening amount $\Delta TH$ is set to the first correction opening amount $\Delta TH1$. That is, the correction opening amount $\Delta TH$ is set through the following process.

$$\Delta TH \leftarrow \Delta TH1$$

In the correction opening amount calculation map (1) (FIG. 6), the correspondence relation between parameters, which are the engine speed Ne and the absolute value of the first correction opening amount $\Delta TH1$, is defined such that the absolute value of the first correction opening amount $\Delta TH1$ is increased with an increase in the engine speed Ne. Also, the first correction opening amount $\Delta TH1$ is set as a positive value. An amount by which the absolute value of the intake vacuum pressure is increased when the opening amount of the throttle valve is decreased by a unit amount tends to decrease with an increase in the engine speed. Accordingly, in the correction opening amount calculation map, the first correction opening amount $\Delta TH1$ is increased with an increase in the engine speed Ne, whereby a range of change in the intake vacuum pressure with respect to a change in the engine speed Ne is decreased. The relation between the first correction opening amount $\Delta TH1$ and the engine speed Ne in the correction opening amount calculation map is set in advance through experiments and the like.

Step S207: The correction opening amount $\Delta TH$ is set to "0". That is, the correction opening amount $\Delta TH$ is set through the following process.

$$\Delta TH \leftarrow 0$$

Figure 7:
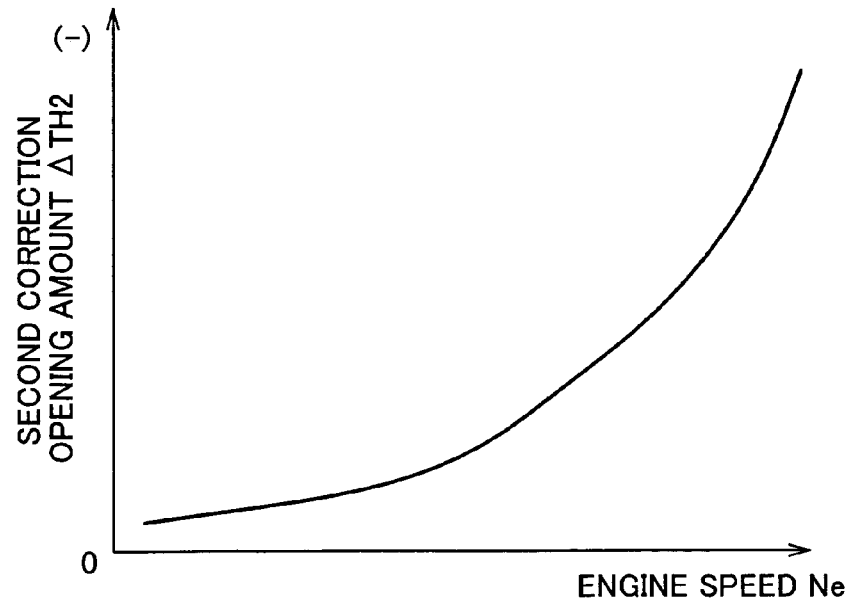
FIG. 7 is a correction opening amount calculation map (2) which is used in the tank pressure adjustment routine in the first embodiment.

Step S208: The correction opening amount ΔTH is set based on the engine speed Ne in the manner described below.
(a) The second correction opening amount ΔTH2 is calculated by applying the engine speed Ne to a correction opening amount calculation map (2) (FIG. 7).
(b) The correction opening amount ΔTH is set to the second correction opening amount ΔTH2. That is, the correction opening amount ΔTH is set through the following process.

ΔTH←ΔTH2

In the correction opening amount calculation map (2) (FIG. 7), the correspondence relation between parameters, which are the engine speed Ne and the absolute value of the second correction opening amount ΔTH2, is defined such that the absolute value of the second correction opening amount ΔTH2 is increased with an increase in the engine speed Ne. Also, the second correction opening amount ΔTH2 is set as a negative value.

An amount by which the pressure in the intake pipe is increased when the opening amount of the throttle valve is increased by a unit amount tends to decrease with an increase in the engine speed. Accordingly, in the correction opening amount calculation map, the second correction opening amount ΔTH2 is increased with an increase in the engine speed Ne, whereby the range of change in the intake vacuum pressure with respect to a change in the engine speed Ne is decreased. The relation between the engine speed and the first correction opening amount ΔTH2 in the correction opening amount calculation map is set in advance through experiments and the like.

Step S209: A final required opening amount TH is calculated based on a basic required opening amount THbase (required opening amount of the throttle valve 13) and the correction opening amount ΔTH. That is, the final required opening amount TH is calculated through the following process.

TH←THbase−ΔTH

The basic required opening amount THbase is set based on a parameter indicating the operating state of the engine 1 including an accelerator operation amount through another routine. In step S209, the final required opening amount TH is calculated in the manner described in one of the following (a) to (c), depending on the set value of the correction opening amount ΔTH.
(a) When the correction opening amount ΔTH is set to the first correction opening amount ΔTH1, the final required opening amount TH is smaller than the basic required opening amount THbase. That is, the following condition is satisfied. In this case, the final required opening amount TH corresponds to the first control opening amount.

TH<THbase (b) When the correction opening amount ΔTH is set to the second correction opening amount ΔTH2, the final required opening amount TH is larger than the basic required opening amount THbase. That is, the following condition is satisfied. In this case, the final required opening amount TH corresponds to the second control opening amount.

TH>THbase (c) When the correction opening amount ΔTH is set to "0", the final required opening amount TH is equal to the basic required opening amount THbase. That is, the following condition is satisfied.

TH=THbase

Step S210: Processes described in the following (a) and (b) are performed.
(a) Control for opening the blockade valve 53 is performed according to the opening duty ratio Dt.
(b) After the opening amount of the throttle valve 13 is controlled to a value equal to the basic required opening amount THbase, the opening amount of the throttle valve 13 is gradually changed from the value equal to the basic required opening amount THbase to a value equal to the final required opening amount TH. When the final required opening amount TH is changed, the opening amount of the throttle valve 13 is changed from a value equal to the final required opening amount TH before changed to a value equal to the final required opening amount TH after changed.

Step S211: Processes described in the following (a) and (b) are performed.
(a) The blockade valve 53 is closed.
(b) The opening amount of the throttle valve 13 is gradually changed from the value equal to the final required opening amount TH to the value equal to the basic required opening amount THbase.

Hereinafter, control performed in "the tank pressure adjustment routine" will be summarized.
(a) In the case where the tank pressure Pt is equal to or higher than the first determination pressure PtX1 (Pt≧PtX1) while purging is performed, the opening amount of the throttle valve 13 is controlled to a value smaller than the basic required opening amount THbase on the condition that the correction coefficient difference ΔFAF is smaller than the predetermined difference ΔFAFX (ΔFAF<ΔFAFX), and the tank pressure Pt is equal to or higher than the second determination pressure PtX2 (Pt≧PtX2).
(b) In the case where the tank pressure Pt is equal to or higher than the first determination pressure PtX1 (Pt>PtX1) while purging is performed, the opening amount of the throttle valve 13 is controlled to a value equal to the basic required opening amount THbase on the condition that the correction coefficient difference ΔFAF is smaller than the predetermined difference ΔFAFX (ΔFAF<ΔFAFX), and the tank pressure Pt is smaller than the second determination pressure PtX2 (Pt<PtX2).
(c) In the case where the tank pressure Pt is equal to or higher than the first determination pressure PtX1 (Pt≧PtX1) while purging is performed, the opening amount of the throttle valve 13 is controlled to a value larger than the basic required opening amount THbase on the condition that the correction coefficient difference ΔFAF is equal to or larger than the predetermined difference ΔFAFX (ΔFAF≧ΔFAFX).

Effects obtained through "the tank pressure adjustment routine" in the embodiment will be described.
(a) In the routine, when the pressure in the pressure-resistance tank 31 is reduced, the opening amount of the throttle valve 13 is corrected to the value that is smaller than the basic required opening amount THbase by the first correction opening amount ΔTH1. Accordingly, since the absolute value of the vacuum pressure in the intake pipe 12 is increased, the difference between the tank pressure and the pressure in the intake pipe 12 is increased. Also, since the flow amount of the vapor flowing out of the pressure-resistance tank 31 is increased, a speed at which the tank pressure is reduced is increased. Thus, since the absolute value of the intake vacuum pressure is actively increased by correcting the opening amount of the throttle valve 13 when the tank pressure is reduced, the ability to purge the vapor can be improved. Also, the sealed fuel tank system can be configured using the hardware configuration of an existing sealed fuel tank system as much as possible.

(b) In the routine, when the tank pressure Pt is lower than the second determination pressure PtX2, the correction of the opening amount of the throttle valve 13 is stopped (i.e., the correction opening amount ΔTH is set to "0"). Thus, it is possible to prevent unnecessary correction of the opening amount of the throttle valve 13.

(c) In the routine, when the correction coefficient difference ΔFAF is equal to or larger than the predetermined difference ΔFAFX, the opening amount of the throttle valve 13 is controlled to the value that is larger than the basic required opening amount THbase by the second correction opening amount ΔTH2. Accordingly, since the pressure in the intake pipe 12 is increased, the difference between the tank pressure and the pressure in the intake pipe 12 is decreased. As a result, since the flow amount of the vapor flowing into the intake pipe 12 is decreased, a deviation between the air-fuel ratio and a stoichiometric air-fuel ratio is reduced. Thus, since the absolute value of the intake vacuum pressure is actively decreased by correcting the opening amount of the throttle valve 13, deterioration of emission gas can be appropriately suppressed. Also, since the opening amount of the throttle valve 13 is corrected to the value larger than the basic required opening amount THbase, and the purge control valve 57 is maintained in the open state, the amount of the vapor in the canister 51 can be reduced as much as possible, and the emission performance can be recovered.

(d) In the routine, the flow amount of the vapor is reduced by controlling the throttle valve 13 in the configuration described in the above (c). The response performance of the throttle valve 13 is high, and the opening amount of the throttle valve 13 can be adjusted with high accuracy, as compared with the blockade valve 53. Thus, deterioration of emission gas can be appropriately suppressed.

(e) In the routine, the correspondence relation between parameters, which are the engine speed Ne and the absolute value of the first correction opening amount ΔTH1, is defined such that the absolute value of the first correction opening amount ΔTH1 is increased with an increase in the engine speed Ne in the correction opening amount calculation map (1) (FIG. 6). Thus, since the range of change in the intake vacuum pressure with respect to the change in the engine speed is decreased when the opening amount of the throttle valve 13 is corrected to the value smaller than the basic required opening amount THbase, controllability of fuel injection performed by the injector 15 can be improved.

(f) In the routine, the correspondence relation between parameters, which are the engine speed Ne and the absolute value of the second correction opening amount ΔTH2, is defined such that the absolute value of the second correction opening amount ΔTH2 is increased with an increase in the engine speed Ne in the correction opening amount calculation map (2) (FIG. 7). Thus, since the range of change in the intake vacuum pressure with respect to the change in the engine speed is decreased when the opening amount of the throttle valve 13 is corrected to the value larger than the basic required opening amount THbase, controllability of fuel injection performed by the injector 15 can be improved.

(g) In the routine, when the correction of the opening amount of the throttle valve 13 is started/finished, the opening amount of the throttle valve 13 is gradually changed to the target value. Thus, deterioration of drivability can be appropriately suppressed.

Figure 8:
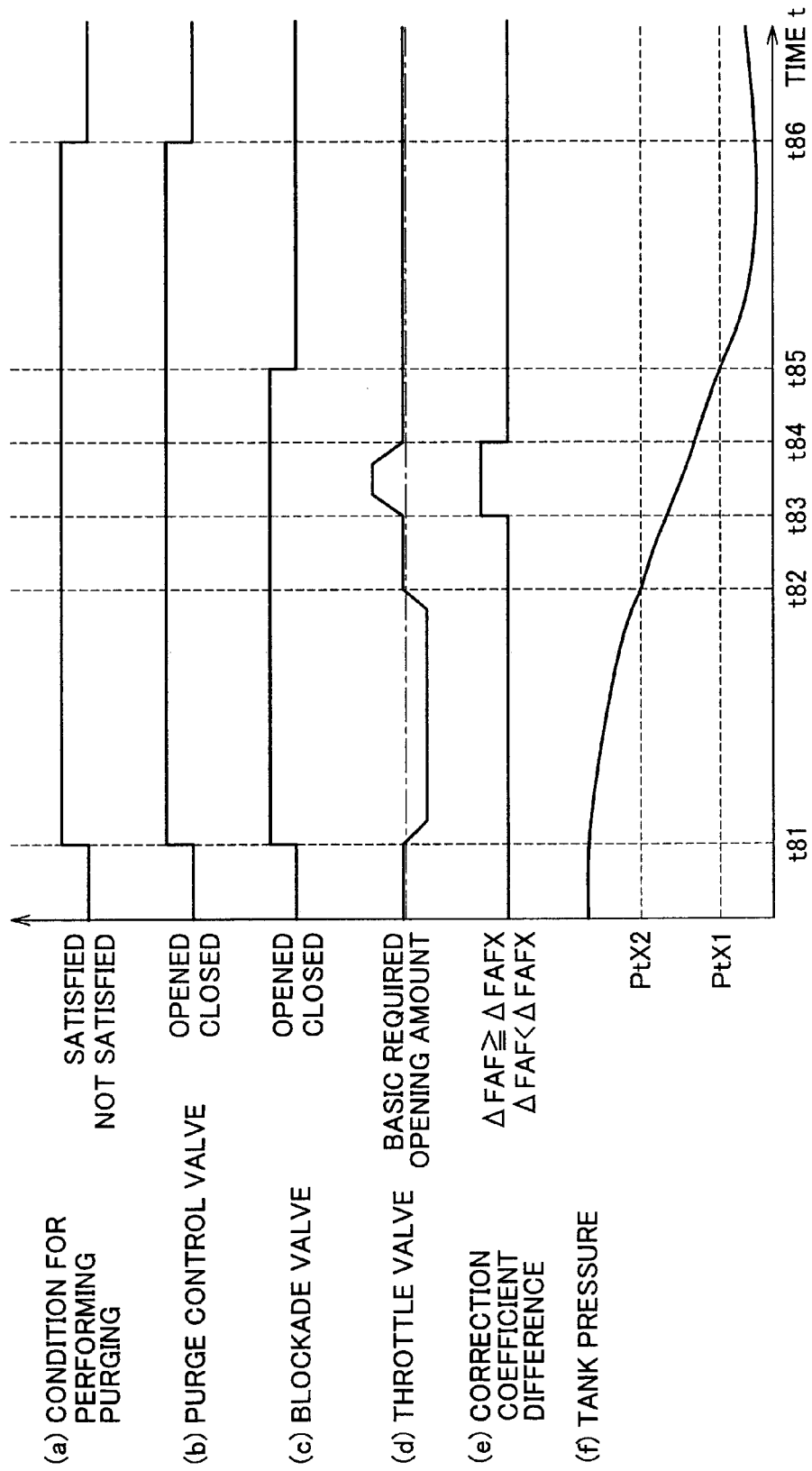
FIG. 8 is a timing chart showing an example of control during the tank pressure adjustment routine in the first embodiment.

Referring to FIG. 8, an example of control in "the tank pressure adjustment routine" will be described. In FIG. 8, each time t indicates the following time.

(a) Time t81 indicates a time at which the condition for performing purging is satisfied.

(b) Time t82 indicates a time at which the tank pressure Pt becomes lower than the second determination pressure PtX2 (Pt<PtX2).

(c) Time t83 indicates a time at which the correction coefficient difference ΔFAF becomes equal to or larger than the predetermined difference ΔFAFX (ΔFAF>ΔFAFX).

(d) Time t84 indicates a time at which the correction coefficient difference ΔFAF becomes smaller than the predetermined difference ΔFAFX (ΔFAF<ΔFAFX).

(e) Time t85 indicates a time at which the tank pressure Pt becomes lower than the first determination pressure PtX1 (Pt<PtX1).

(f) Time t86 indicates a time at which the condition for performing purging becomes no longer satisfied.

In the routine, the tank pressure is adjusted in the manner described below.

(a) The purge control valve 57 is opened.

(b) The blockade valve 53 is opened based on the fact that the tank pressure Pt is equal to or higher than the first determination pressure PtX1 (Pt≧PtX1).

(c) The opening amount of the throttle valve 13 is set to the value that is smaller than the basic required opening amount THbase by the first correction opening amount ΔTH1, based on the fact that the tank pressure Pt is equal to or higher than the second determination pressure PtX2 (Pt≧PtX2).

At time t82, the following process is performed.

(d) The opening amount of the throttle valve 13 is set to the value equal to the basic required opening amount THbase, based on the fact that the tank pressure is lower than the second determination pressure PtX2 (Pt<PtX2).

At time t83, the following process is performed.

(e) The opening amount of the throttle valve 13 is set to the value that is larger than the basic required opening amount THbase by the second correction opening amount ΔTH2, based on the fact that the correction coefficient difference ΔFAF is equal to or larger than the predetermined difference ΔFAFX (ΔFAF≧ΔFAFX).

At time t84, the following process is performed.

(f) The opening amount of the throttle valve 13 is set to the value equal to the basic required opening amount THbase, based on the fact that the correction coefficient difference ΔFAF is smaller than the predetermined difference ΔFAFX (ΔFAF<ΔFAFX).

At time t85, the following process is performed.

(g) The blockade valve 53 is closed based on the fact that the tank pressure Pt is smaller than the first determination pressure PtX1 (Pt<PtX1).

At time t86, the following process is performed.

(h) The purge control valve 57 is closed based on the fact that the condition for performing purging is not satisfied.

As described above in detail, in the control apparatus for a sealed fuel tank system according to the first embodiment, the excellent effects described below can be obtained.

(1) In the embodiment, when the pressure in the pressure-resistance tank 31 is reduced, the opening amount of the throttle valve 13 is corrected to the value that is smaller than the basic required opening amount THbase by the first correction opening amount ΔTH1. Thus, the pressure in the pressure-resistance tank 31 can be reduced quickly.

(2) In the embodiment, when the tank pressure is reduced, the absolute value of the intake vacuum pressure is actively increased by correcting the opening amount of the throttle valve 13. Thus, the ability to purge the vapor can be improved.

(3) In the embodiment, the absolute value of the vacuum pressure applied to the pressure-resistance tank 31 is increased by adjusting the opening amount of the throttle valve 13. Thus, the sealed fuel tank system can be configured using the hardware configuration of the existing sealed fuel tank system as much as possible.

(4) In the embodiment, when the tank pressure Pt is lower than the second determination pressure PtX2, the correction of the opening amount of the throttle valve 13 is not performed. Thus, it is possible to prevent unnecessary correction of the opening amount of the throttle valve 13.

(5) In the embodiment, when the correction coefficient difference ΔFAF is equal to or larger than the predetermined difference ΔFAFX, the opening amount of the throttle valve 13 is corrected to the value that is larger than the basic required opening amount THbase by the second correction opening amount ΔTH2. Thus, deterioration of emission gas can be appropriately suppressed.

(6) In the embodiment, when the opening amount of the throttle valve 13 is corrected to the value larger than the basic required opening amount THbase, the purge control valve 57 is maintained in the open state. Thus, the amount of the vapor in the canister 51 can be reduced as much as possible, and the emission performance can be recovered.

(7) In the embodiment, the flow amount of the vapor is reduced by controlling the throttle valve 13 in the configuration described in the above (5). Thus, the emission performance can be recovered quickly.

(8) In the embodiment, the correspondence relation between the parameters, which are the engine speed Ne and the absolute value of the first correction opening amount ΔTH1, is defined such that the absolute value of the first correction opening amount ΔTH1 is increased with an increase in the engine speed Ne in the correction opening amount calculation map (1) (FIG. 6). Thus, controllability of fuel injection performed by the injector 15 can be improved.

(9) In the embodiment, the correspondence relation between the parameters, which are the engine speed Ne and the absolute value of the second correction opening amount ΔTH2, is defined such that the absolute value of the second correction opening amount ΔTH2 is increased with an increase in the engine speed Ne in the correction opening amount calculation map (2) (FIG. 7). Thus, controllability of fuel injection performed by the injector 15 can be improved.

(10) In the embodiment, when the correction of the opening amount of the throttle valve 13 is started/finished, the opening amount of the throttle valve 13 is gradually changed to the target value. Thus, deterioration of drivability can be appropriately suppressed.

(11) In the embodiment, since the possibility that the pressure in the pressure-resistance tank 31 is maintained at a value lower than the first determination pressure PtX1 is increased through the routine, the operation of fuel supply can be appropriately suppressed from taking a long time due to high tank pressure.

The first embodiment may be appropriately modified. Thus, the invention can be realized, for example, in the following embodiments.

In the first embodiment, it is determined whether the correction coefficient difference ΔFAF is smaller than the predetermined difference ΔFAFX in "the tank pressure adjustment routine". However, this determination process can be omitted. In this case, the process in step S208 is also omitted.

In the first embodiment, it is determined whether the tank pressure Pt is equal to or higher than the second determination pressure PtX2 in "the tank pressure adjustment routine". However, this determination process can be omitted. In this case, the process in step S207 is also omitted.

In the first embodiment, it is determined whether the tank pressure Pt is equal to or higher than the second determination pressure PtX2, and it is determined whether the correction coefficient difference ΔFAF is smaller than the predetermined difference ΔFAFX in "the tank pressure adjustment routine". However, these determination processes can be omitted. In this case, the processes in step S207 and step S208 are also omitted.

In the first embodiment, when the opening duty ratio Dt is calculated, the calculation map shown in FIG. 5 is used. However, the invention is not limited to the calculation map shown in FIG. 5, and the map may be appropriately changed.

In the first embodiment, the correspondence relation between the engine speed Ne and the first correction opening amount ΔTH1 is defined as shown in FIG. 6. However, the invention is not limited to the correspondence relation between the parameters shown in FIG. 6, and the correspondence relation may be appropriately changed. In brief, any relation may be defined as long as the absolute value of the first correction opening amount ΔTH1 is increased with an increase in the engine speed Ne.

In the first embodiment, the first correction opening amount ΔTH1 is calculated using the correction opening amount calculation map (1) (FIG. 6). However, for example, the configuration may be changed as follows. That is, the first correction opening amount ΔTH1 may be calculated by applying the engine speed Ne to an appropriate equation, instead of the calculation map.

In the first embodiment, the correspondence relation between the engine speed Ne and the second correction opening amount ΔTH2 is defined as shown in FIG. 7. However, the invention is not limited to the correspondence relation between the parameters shown in FIG. 7, and the correspondence relation may be appropriately changed. In brief, any relation may be defined as long as the absolute value of the second correction opening amount ΔTH2 is increased with an increase in the engine speed Ne.

In the first embodiment, the second correction opening amount ΔTH2 is calculated using the correction opening amount calculation map (2) (FIG. 7). However, for example, the configuration may be changed as follows. That is, the second correction opening amount ΔTH2 may be calculated by applying the engine speed Ne to an appropriate equation, instead of the calculation map.

In the first embodiment, the blockade valve 53 is controlled to be opened in coordination of the purge control valve 57. However, control of the blockade valve 53 may be performed separately from control of the purge control valve 57.

A second embodiment of the invention will be described with reference to FIG. 9. In the second embodiment, it is assumed that the configuration of the sealed fuel tank system F in the first embodiment is changed to a configuration shown in FIG. 9. Hereinafter, portions that are different from those in the first embodiment will be described.

Components constituting the vapor purging device 5 will be described. The first vapor pipe 52 connects the upper portion of the pressure-resistance tank 31 and the intake pipe 12. Also, the first vapor pipe 52 has the blockade valve 53.

The blockade valve 53 opens/closes the first vapor pipe 52. The blockade valve 53 is controlled through the ECU 7. Basically, the blockade valve 53 is maintained in the closed state (non-energized state).

In the sealed fuel tank system F in the embodiment, the first vapor pipe 52 corresponds to the vaporized fuel supply pipe. Also, the controller is configured so as to include the ECU 7.

In the vapor purging device 5, "purging" and "tank pressure adjustment" are performed in the manner described below. Operation of purging will be described. When the condition for performing purging is satisfied (for example, when the engine coolant temperature THw is equal to or higher than a predetermined temperature) during operation of the engine 1, the blockade valve 53 is opened. Thus, since the vacuum pressure in the intake pipe 12 is applied to the inside of the pressure-resistance tank 31, purge gas in the pressure-resistance tank 31 is purged to the intake pipe 12 through the first vapor pipe 52.

Adjustment of the pressure in the pressure-resistance tank 31 will be described. When it is detected that the tank pressure Pt is equal to or higher than the first determination pressure PtX1, the blockade valve 53 is opened. Thus, the purge gas in the pressure-resistance tank 31 flows into the intake pipe 12 through the first vapor pipe 52.

In the vapor purging device 5 in the embodiment, "the tank pressure adjustment routine" is performed in the manner described below. In the embodiment, "the purging routine" (FIG. 2) is omitted.

Basically, "the tank pressure adjustment routine" in the embodiment is performed in the same manner as in the first embodiment. However, the process in step S201 is omitted when the routine is performed.

As described above in detail, with the control apparatus for a sealed fuel tank system according to the second embodiment of the invention, it is possible to obtain effects similar to those described in the aforementioned (1) to (11) which are obtained in the first embodiment.

A third embodiment of the invention will be described with reference to FIG. 10 to FIG. 14. In the third embodiment, it is assumed that the sealed fuel tank system F in the first embodiment is applied to a hybrid vehicle.

Figure 10:
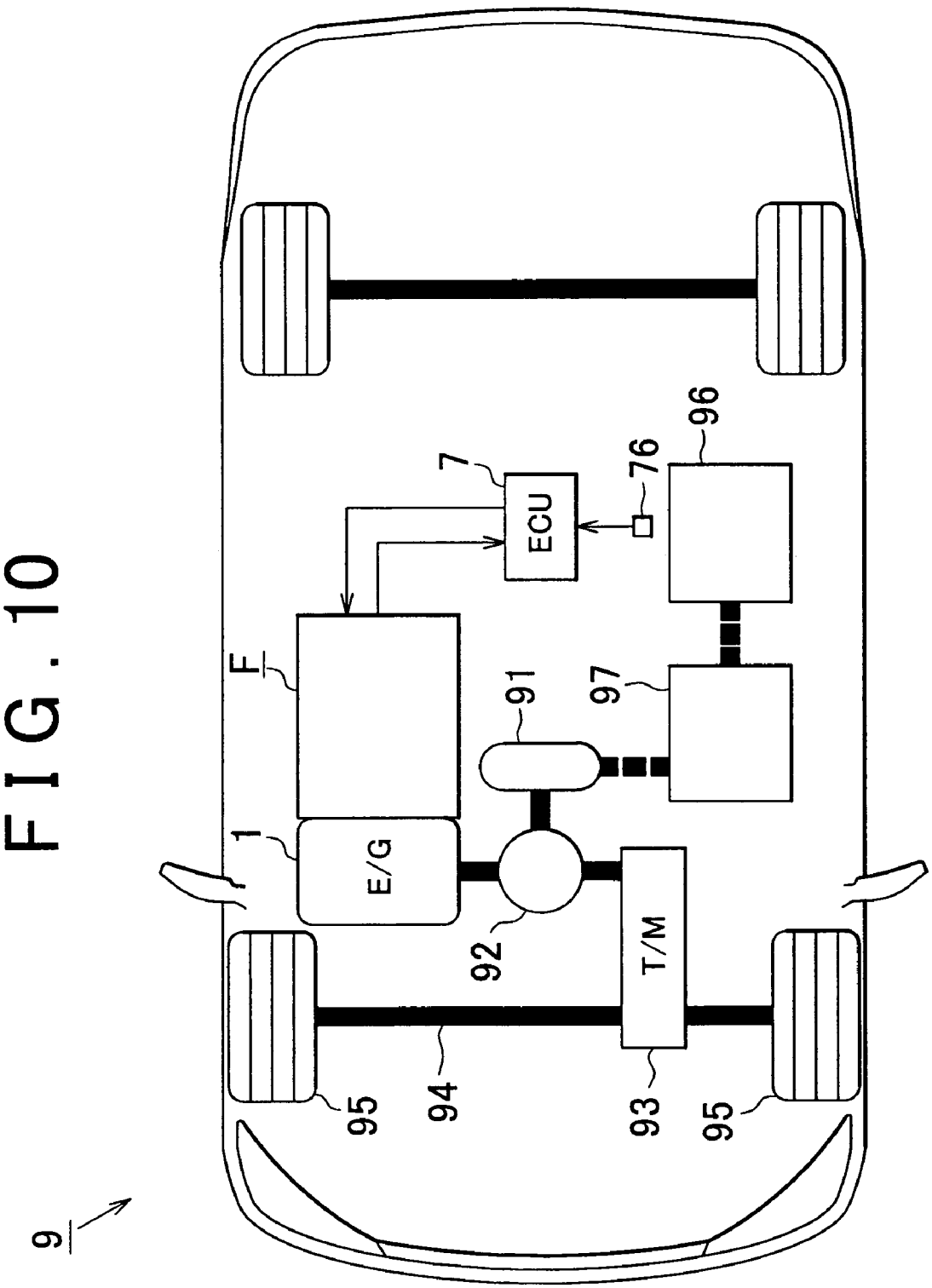
FIG. 10 is a schematic diagram showing an entire configuration of a hybrid vehicle including a control apparatus for a sealed fuel tank system according to a third embodiment of the invention.

Referring to FIG. 10, a configuration of a hybrid vehicle 9 will be described. In FIG. 10, power is transmitted along a path indicated by a solid line, and electric power is transmitted along a path indicated by a dashed line. The hybrid vehicle 9 includes an engine 1 and a motor-generator 91 (motor for driving the vehicle) as a source of power. The motor-generator 91 has a function as a motor and a function as a generator.

Power is transmitted by a power splitting mechanism 92 in the manner described below.

(a) Power is transmitted between the engine 1 and the motor-generator 91.
(b) Power is transmitted between the engine 1 and a transmission 93.
(c) Power is transmitted between the motor-generator 91 and the transmission 93.

The transmission 93 changes the magnitude of power transmitted from the engine 1 and the motor-generator 91, and outputs the power to a drive shaft 94. The drive shaft 94 drives a wheel 95 using the power transmitted from the transmission 93.

The battery 96 supplies electric power to the motor-generator 91 through an inverter with a converter 97. Also, electric power generated by the motor-generator 91 is supplied to the battery 96 through the invert with the converter 97, whereby the battery 96 is charged with the electric power.

The ECU 7 controls the hybrid vehicle 9. The sealed fuel tank system F supplies the vapor gas to the engine 1. A battery computer 76 detects a state of charge (a charge amount) of the battery 96. A value detected by the battery computer 76 is input to the ECU 7 as a charge amount SOC. In the embodiment, an output compensation device is configured so as to include the motor-generator 91.

In the embodiment, "the purging routine" is performed in the same manner as in the first embodiment.

Figure 11:
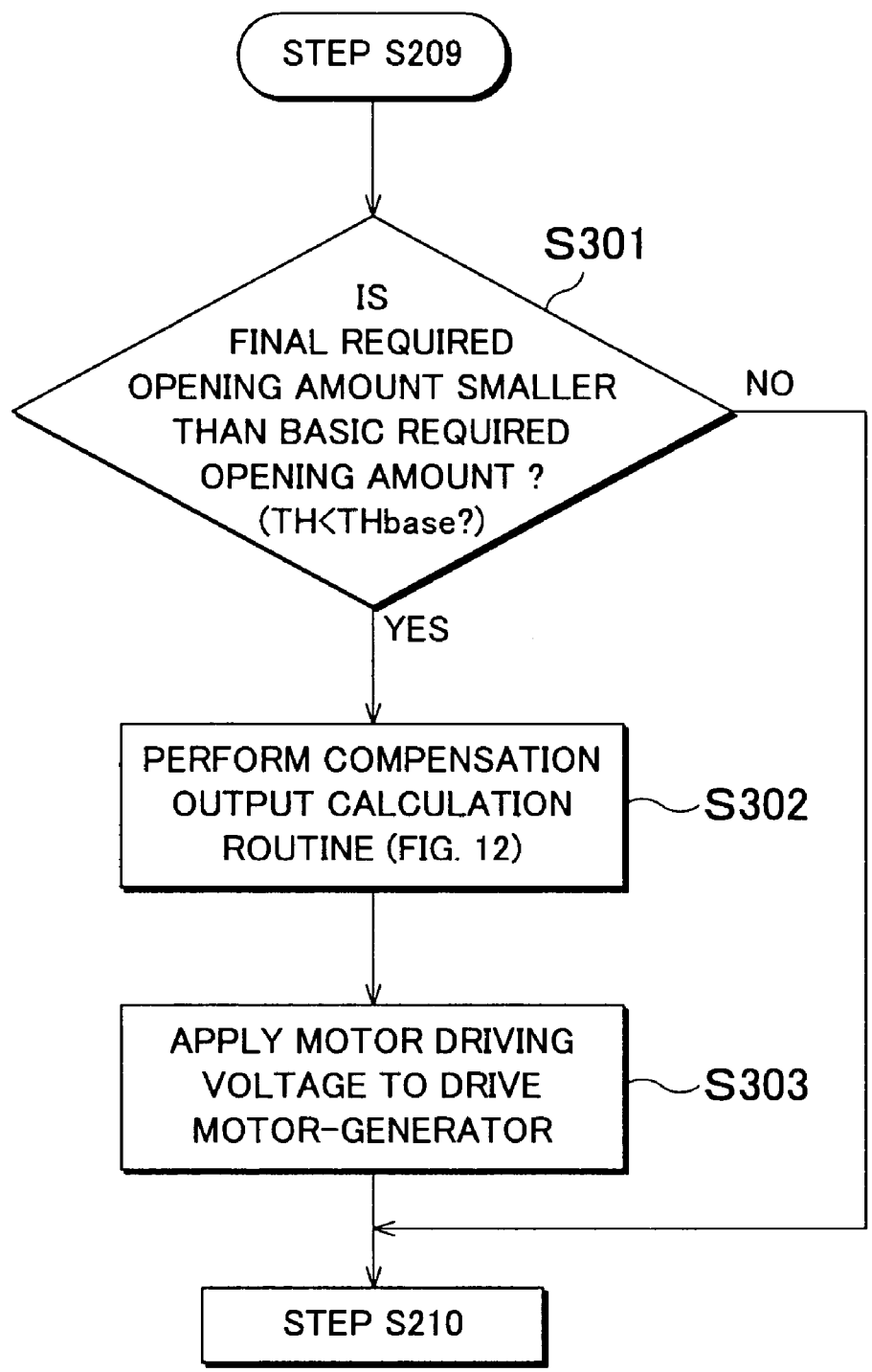
FIG. 11 is a flow chart showing part of the tank pressure adjustment routine performed in the third embodiment.
Figure 12:
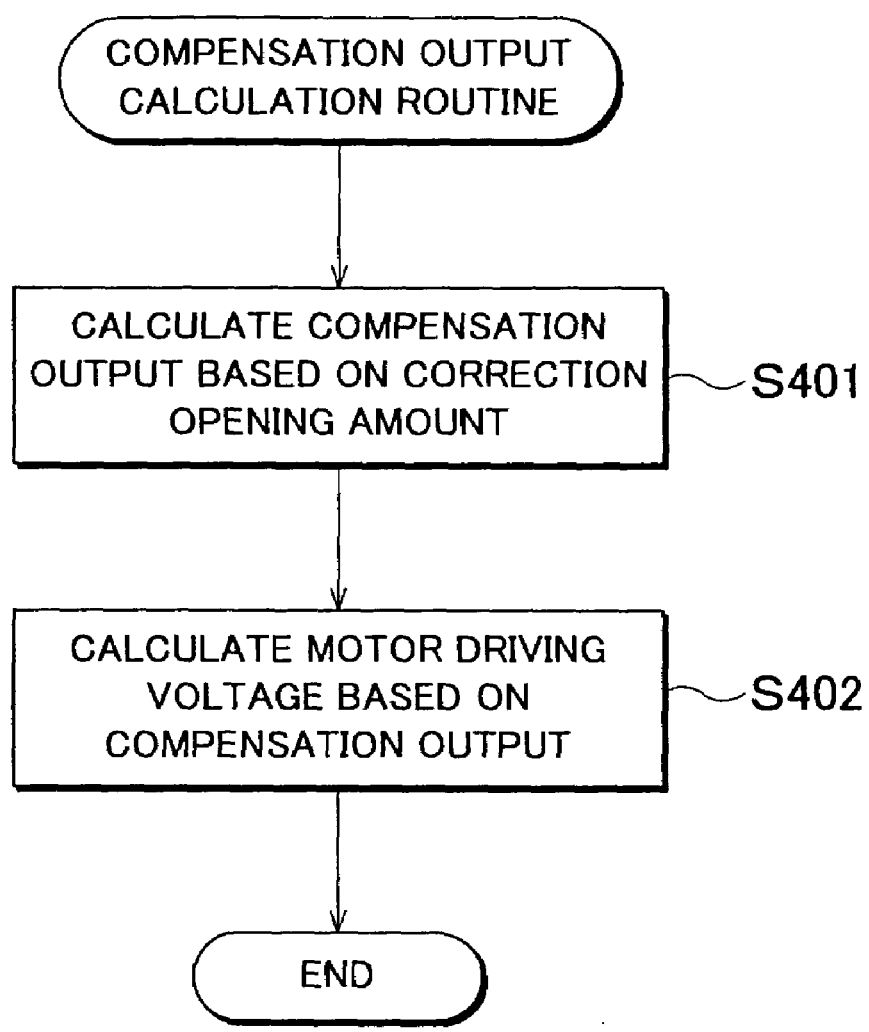
FIG. 12 is a flow chart showing a compensation output calculation routine performed during the tank pressure adjustment routine in the third embodiment.

In the embodiment, basically, "the tank pressure adjustment routine" is performed in the same manner as in the first embodiment. However, the processes described below are added when the routine is performed. Referring to FIG. 11 and FIG. 12, the processes added to the routine will be described. After the process in the aforementioned step S209 (FIG. 4) is performed, the routine proceeds to step S301.

Step S301: It is determined whether the final required opening amount TH is smaller than the basic required opening amount THbase. That is, it is determined whether the following condition is satisfied.

TH<THbase

When the final required opening amount TH is smaller than the basic required opening amount THbase, the routine proceeds to step S302. When the final required opening amount TH is equal to or larger than the basic required opening amount THbase, the routine proceeds to the aforementioned step S210.

Step S302: "A compensation output calculation routine" (FIG. 12) is performed for calculating an amount of decrease in an engine output which is caused by correction of the opening amount of the throttle valve 13.

Figure 13:
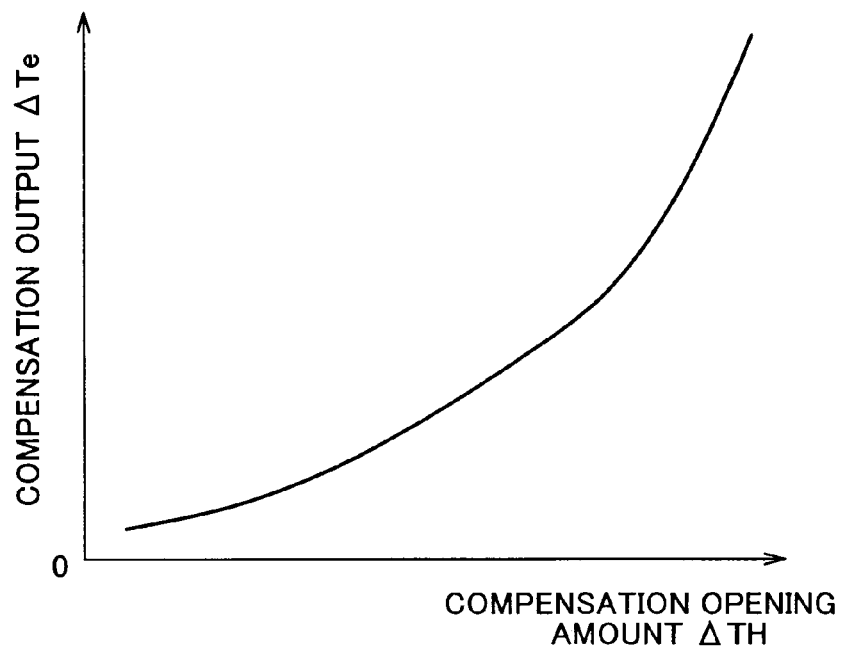
FIG. 13 is a compensation output calculation map which is used in the compensation output calculation routine in the third embodiment.

Step S401: Based on the correction opening amount ΔTH (first correction opening amount ΔTH1), a calculation is performed to obtain the amount of decrease in the engine output (compensation output ΔTe) when the opening amount of the throttle valve 13 is corrected using the correction opening amount ΔTH1. That is, a calculation is performed to obtain an engine output equivalent to a difference between an engine output Te1 when the opening amount of the throttle valve 13 is set to the value equal to the basic required opening amount THbase, and an engine output Te2 when the opening amount of the throttle valve 13 is set to the value that is smaller than the basic required opening amount THbase by the first correction opening amount ΔTH1. The compensation output ΔTe can be calculated by applying the correction opening amount ΔTH to a compensation output calculation map (FIG. 13). The relation between the correction opening amount ΔTH and the compensation output ΔTe is set in advance through experiments and the like.

Figure 14:
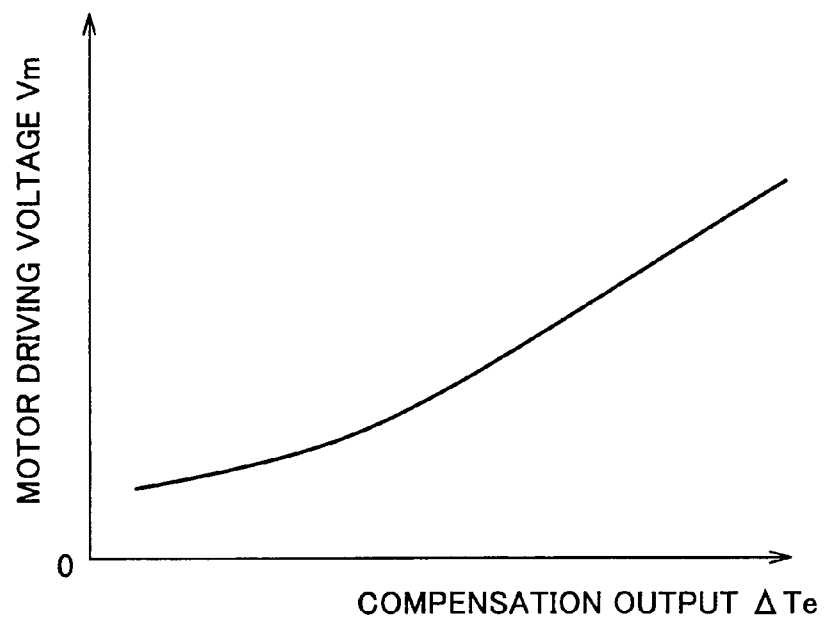
FIG. 14 is a driving voltage calculation map which is used in the compensation output calculation routine in the third embodiment.

Step S402: Based on the compensation output ΔTe, a calculation is performed to obtain a driving voltage (motor driving voltage Vm) for the motor-generator 91, which is required for causing the motor-generator 91 to generate the compensation output ΔTe. The motor driving voltage Vm can be calculated by applying the compensation output ΔTe to a driving voltage calculation map (FIG. 14). The relation between the compensation output ΔTe and the motor driving voltage Vm in the driving voltage calculation map is set in advance through experiments and the like. After the process in step S402 is performed, the routine proceeds to step S303 (FIG. 11).

Step S303: The motor driving voltage Vm is applied to the motor-generator 91, and the motor-generator 91 assists the engine 1. The motor-generator 91 continues to assist the engine 1 as long as the condition that the final required opening amount TH is smaller than the basic required opening amount THbase is satisfied in step S303. After the process in step S303 is performed, the routine proceeds to the process in the aforementioned step S210.

As described above in detail, with the control apparatus for a sealed fuel tank system according to the third embodiment of the invention, it is possible to obtain effects similar to those described in the aforementioned (1) to (11) which are obtained in the first embodiment. Further, the effects described below can be obtained.

(12) In general, with respect to the hybrid vehicle 9, there is a concern described below. In the hybrid vehicle 9, the engine 1 is operated with the opening amount of the throttle valve 13 being maintained in the vicinity of the maximum opening amount in order to improve the fuel efficiency of the engine 1 during running. Accordingly, since the intake vacuum pressure is decreased, the flow amount of the vapor purged to the intake pipe 12 is decreased. As a result, the pressure in the pressure-resistance tank 31 is not sufficiently reduced. However, in the configuration of the embodiment, since the absolute value of the intake vacuum pressure is actively increased through the correction of the opening amount of the throttle valve 13, the speed at which the tank pressure is reduced is increased even in the hybrid vehicle 9.

(13) In the embodiment, a calculation is performed to obtain the amount of decrease in the engine output (compensation output $\Delta Te$) when the opening amount of the throttle valve 13 is corrected using the first correction opening amount $\Delta TH1$, and this decrease amount is compensated for, using the motor-generator 91. Thus, it is possible to obtain the required output according to the accelerator operation and the like, and to reduce the pressure in the pressure-resistance tank 31 quickly.

The third embodiment may be appropriately modified. Thus, the invention can be realized, for example, in the following embodiments.

In the third embodiment, it is assumed that the control apparatus for a sealed fuel tank system is applied to the hybrid vehicle 9 having the structure shown in FIG. 10. However, the control apparatus for a sealed tank system according to the third embodiment may be applied to any hybrid vehicle.

In the third embodiment, the compensation output $\Delta Te$ is calculated using the compensation output calculation map (FIG. 13). However, for example, the configuration may be changed as follows. That is, the compensation output $\Delta Te$ may be calculated by applying the correction opening amount $\Delta TH$ to an appropriate equation, instead of the calculation map.

In the third embodiment, the motor driving voltage Vm is calculated using the driving voltage calculation map (FIG. 14). However, for example, the configuration may be changed as follows. That is, the motor driving voltage Vm may be calculated by applying the compensation output $\Delta Te$ to an appropriate equation, instead of the calculation map.

A fourth embodiment of the invention will be described with reference to FIG. 15 and FIG. 16. In the embodiment, the processes in step S206 and step S208 in "the tank pressure adjustment routine" (FIG. 3 and FIG. 4) in the first embodiment are changed as follows.

Step S206: Based on a change in the engine speed Ne (engine speed change amount $\Delta Ne$), the correction amount of the opening amount of the throttle valve 13 (correction opening amount $\Delta TH$) is set in the manner described below.

Figure 15:
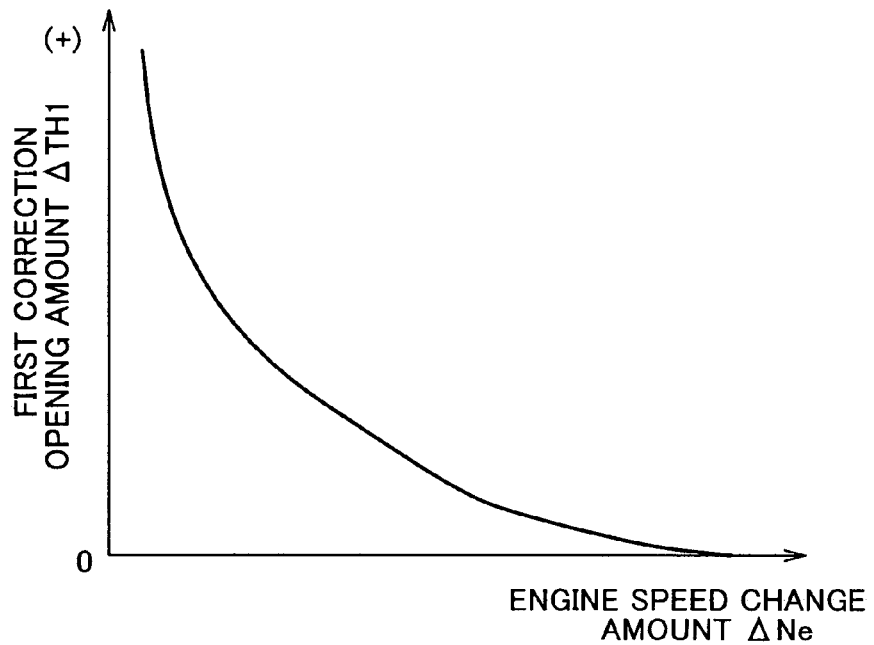
FIG. 15 is a correction opening amount calculation map (3) which is used in a tank pressure adjustment routine in a control apparatus for a sealed fuel tank system according to a fourth embodiment of the invention.

(a) The first correction opening amount $\Delta TH1$ is calculated by applying the engine speed Ne to a correction opening amount calculation map (3) (FIG. 15).

(b) The correction opening amount $\Delta TH$ is set to the first correction opening amount $\Delta TH1$. The engine speed change amount $\Delta Ne$ is calculated through the following process.

$$\Delta Ne \leftarrow Ne_i - Ne_{i-1}$$

"$Ne_i$" indicates a value that is detected by the engine speed sensor 72 at present, and "$Ne_{i-1}$" indicates a value that was detected by the engine speed sensor 72 a unit time before.

In the correction opening amount calculation map (3) (FIG. 15), the correspondence relation between parameters, which are the engine speed change amount $\Delta Ne$ and the first correction opening amount $\Delta TH1$, is defined such that the absolute value of the first correction opening amount $\Delta TH1$ is decreased with an increase in the engine speed change amount $\Delta Ne$. Also, the first correction opening amount $\Delta TH1$ is set as a positive value. When the flow amount of the vapor purged to the intake pipe 12 excessively increases, the degree of change in the engine speed increases. Accordingly, in the aforementioned calculation map, when the engine speed change amount $\Delta Ne$ is large, the first correction opening amount $\Delta TH1$ is made small, whereby the absolute value of the intake vacuum pressure is made small. The relation between the engine speed change amount $\Delta Ne$ and the first correction opening amount $\Delta TH1$ in the correction opening amount calculation map is set in advance through experiments and the like.

Step S208: Based on the engine speed change amount $\Delta Ne$, the correction opening amount $\Delta TH$ is set in the manner described below.

Figure 16:
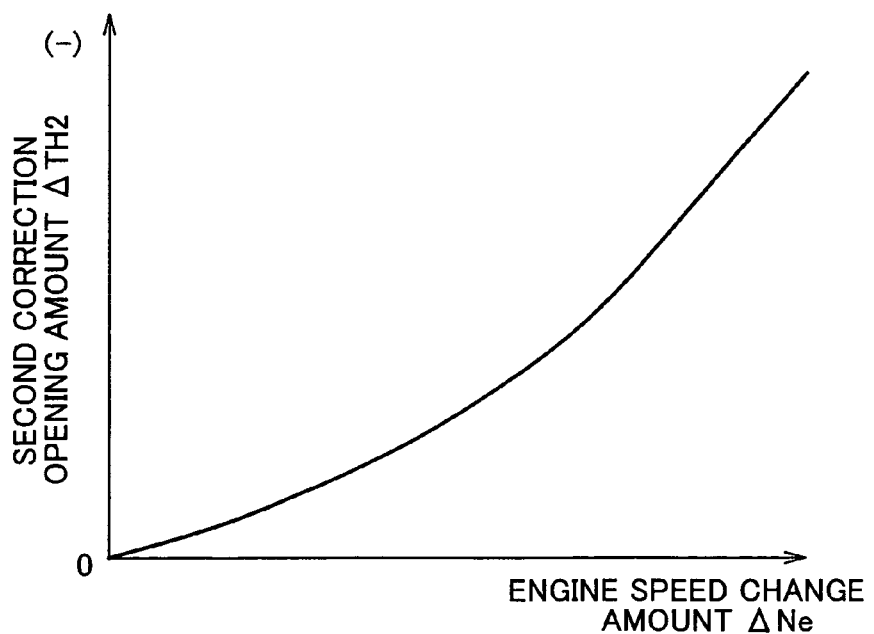
FIG. 16 is a correction opening amount calculation map (4) which is used in the tank pressure adjustment routine in the fourth embodiment.

(a) The second correction opening amount $\Delta TH2$ is calculated by applying the engine speed change amount $\Delta Ne$ to a correction opening amount calculation map (4) (FIG. 16).

(b) The correction opening amount $\Delta TH$ is set to the second correction opening amount $\Delta TH2$.

In the correction opening amount calculation map (4) (FIG. 16), the correspondence relation between parameters, which are the engine speed change amount $\Delta Ne$ and the second correction opening amount $\Delta TH2$, is defined such that the absolute value of the second correction opening amount $\Delta TH2$ is increased with an increase in the engine speed change amount $\Delta Ne$. Also, the second correction opening amount $\Delta TH2$ is set as a negative value.

When the flow amount of the vapor purged to the intake pipe 12 excessively increases, the degree of change in the engine speed increases. Accordingly, in the aforementioned calculation map, when the engine speed change amount $\Delta Ne$ is large, the second correction opening amount $\Delta TH2$ is made large, whereby the absolute value of the intake vacuum pressure is made small. The relation between the engine speed change amount $\Delta Ne$ and the second correction opening amount $\Delta TH2$ is set in advance through experiments and the like.

As described above in detail, with the control apparatus for a sealed fuel tank system according to the fourth embodiment of the invention, it is possible to obtain effects similar to those described in the aforementioned (1) to (11) which are obtained in the first embodiment.

(14) In the embodiment, the first opening amount $\Delta TH1$ is set using the correction opening amount calculation map (3) (FIG. 15). Thus, deterioration of the operating state of the engine 1 can be appropriately suppressed.

(15) In the embodiment, the second opening amount ΔTH2 is set using the correction opening amount calculation map (4). Thus, deterioration of the operating state of the engine 1 can be appropriately suppressed.

The fourth embodiment may be appropriately modified. Thus, the invention can be realized, for example, in the following embodiments.

In the fourth embodiment, the correspondence relation between the engine speed change amount ΔNe and the first correction opening amount ΔTH1 is defined as shown in FIG. 15. However, the invention is not limited to the correspondence relation between the parameters shown in FIG. 15, and the correspondence relation may be appropriately changed. In brief, any relation may be defined as long as the absolute value of the first correction opening amount ΔTH1 is decreased with an increase in the engine speed change amount ΔNe.

In the fourth embodiment, the first correction opening amount ΔTH1 is calculated using the correction opening amount calculation map (3) (FIG. 15). However, for example, the configuration may be changed as follows. That is, the first correction opening amount ΔTH1 may be calculated by applying the engine speed change amount ΔNe to an appropriate equation, instead of the calculation map.

In the fourth embodiment, the correspondence relation between the engine speed change amount ΔNe and the second correction opening amount ΔTH2 is defined as shown in FIG. 16. However, the invention is not limited to the correspondence relation between the parameters shown in FIG. 16, and the correspondence relation may be appropriately changed. In brief, any relation may be defined as long as the absolute value of the second correction opening amount ΔTH2 is increased with an increase in the engine speed change amount ΔNe.

In the fourth embodiment, the second correction opening amount ΔTH2 is calculated using the correction opening amount calculation map (4) (FIG. 16). However, for example, the configuration may be changed as follows. That is, the second correction opening amount ΔTH2 is calculated by applying the engine speed change amount ΔNe to an appropriate equation, instead of the calculation map.

A fifth embodiment of the invention will be described with reference to FIG. 17 and FIG. 18. In the embodiment, the processes in step S206 and step S208 in "the tank pressure adjustment routine"(FIG. 3 and FIG. 4) in the first embodiment are changed as follows.

Step S206: Based on a difference between the feedback correction coefficient FAF and the reference value "1" (correction coefficient difference ΔFAF), the correction amount of the opening amount of the throttle valve 13 (correction opening amount ΔTH) is set as follows.
(a) The first correction opening amount ΔTH1 is calculated by applying the correction coefficient difference ΔFAF to a correction opening amount calculation map (5) (FIG. 17).
(b) The correction opening amount ΔTH is set to the first correction opening amount ΔTH1.

In the correction opening amount calculation map (5) (FIG. 17), the correspondence relation between parameters, which are the correction coefficient difference ΔFAF and the first correction opening amount ΔTH1, is defined such that the absolute value of the first correction opening amount ΔTH1 is decreased with an increase in the correction coefficient difference ΔFAF. Also, the first correction opening amount ΔTH1 is set as a positive value. When the flow amount of the vapor purged to the intake pipe 12 excessively increases, the air-fuel ratio deviates from the stoichiometric air-fuel ratio to a large extent. Accordingly, in the calculation map, when the correction coefficient difference ΔFAF is large, the first correction opening amount ΔTH1 is made small, whereby the absolute value of the intake vacuum pressure is made small. The relation between the first correction opening amount ΔTH1 and the correction coefficient difference ΔFAF in the correction opening amount calculation map is set in advance through experiments and the like.

Step S208: Based on the correction coefficient difference ΔFAF, the correction amount of the opening amount of the throttle valve 13 (correction opening amount ΔTH) is set in the manner described below.
(a) The second correction opening amount ΔTH2 is calculated by applying the correction coefficient difference ΔFAF to a correction opening amount calculation map (6) (FIG. 18).
(b) The correction opening amount ΔTH is set to the second correction opening amount ΔTH2.

In the correction opening amount calculation map (6) (FIG. 18), the correspondence relation between parameters, which are the correction coefficient difference ΔFAF and the second correction opening amount ΔTH2, is defined such that the absolute value of the second correction opening amount ΔTH2 is increased with an increase in the correction coefficient difference ΔFAF. Also, the second correction opening amount ΔTH2 is set as a negative value. When the flow amount of the vapor purged to the intake pipe 12 excessively increases, the air-fuel ratio deviates from the stoichiometric air-fuel ratio to a large extent. Accordingly, in the aforementioned calculation map, when the correction coefficient difference ΔFAF is large, the second correction opening amount ΔTH2 is made small, whereby the absolute value of the intake vacuum pressure is made small. The relation between the second correction opening amount ΔTH2 and the correction coefficient difference ΔFAF is set in advance through experiments and the like.

As described above in detail, with the control apparatus for a sealed fuel tank system according to the fifth embodiment, it is possible to obtain effects similar to those described in the aforementioned (1) to (11) which are obtained in the first embodiment.

Figure 17:
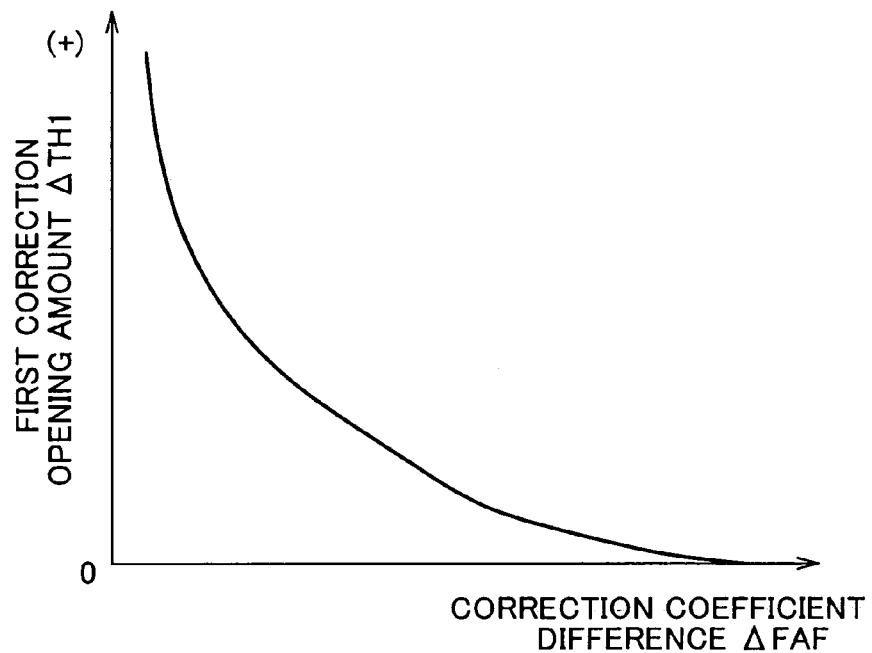
FIG. 17 is a correction opening amount calculation map (5) which is used in the tank pressure adjustment routine in a control apparatus for a sealed fuel tank system according to a fifth embodiment of the invention.

(16) In the embodiment, the first correction opening amount ΔTH1 is set using the correction opening amount calculation map (5) (FIG. 17). Thus, deterioration of emission gas can be appropriately suppressed.

Figure 18:
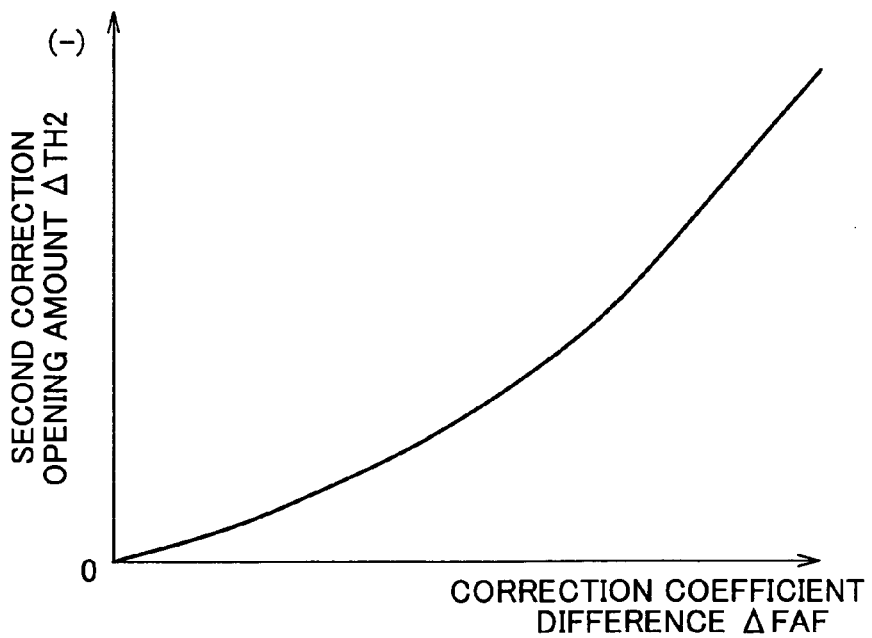
FIG. 18 is a correction opening amount calculation map (6) which is used in the tank pressure adjustment routine in the fifth embodiment.

(17) In the embodiment, the second correction opening amount ΔTH2 is set using the correction opening amount calculation map (6) (FIG. 18). Thus, deterioration of emission gas can be appropriately suppressed.

The fifth embodiment may be appropriately modified. Thus, the invention can be realized, for example, in the following embodiments.

In the fifth embodiment, the correspondence relation between the correction coefficient difference ΔFAF and the first correction opening amount ΔTH1 is defined as shown in FIG. 17. However, the invention is not limited to the correspondence relation between the parameters shown in FIG. 17, and the correspondence relation may be appropriately changed. In brief, any relation may be defined as long as the absolute value of the first correction opening amount ΔTH1 is decreased with an increase in the correction coefficient difference ΔFAF.

In the fifth embodiment, the first correction opening amount ΔTH1 is calculated using the correction opening amount calculation map (5) (FIG. 17). However, for example, the configuration may be changed as follows. That is, the first correction opening amount ΔTH1 may be calculated by applying the correction coefficient difference ΔFAF to an appropriate equation, instead of the calculation map.

In the fifth embodiment, the correspondence relation between the correction coefficient difference ΔFAF and the second correction opening amount ΔTH2 is defined as shown in FIG. 18. However, the invention is not limited to the correspondence relation between the parameters shown in FIG. 18, and the correspondence relation may be appropriately changed. In brief, any relation may be defined as long as the absolute value of the first correction opening amount ΔTH2 is increased with an increase in the correction coefficient difference ΔFAF.

In the fifth embodiment, the second correction opening amount ΔTH2 is calculated using the correction opening amount calculation map (6) (FIG. 18). However, for example, the configuration may be changed as follows. That is, the second correction opening amount ΔTH2 may be calculated by applying the correction coefficient difference ΔFAF to an appropriate equation, instead of the calculation map.

Hereinafter, elements that can be changed in all the aforementioned embodiments will be described.

In each of the aforementioned embodiments, the first correction opening amount ΔTH1 is variably set according to the parameter indicating the operating state of the engine 1. However, the first correction opening amount ΔTH1 may be a fixed value.

The first correction opening amount ΔTH1 may be variably set according to an appropriate parameter other than the parameters indicating the operating state of the engine 1 which are used in the aforementioned embodiments (the engine speed Ne, the engine speed change amount ΔNe, and the correction coefficient difference ΔFAF).

In each of the aforementioned embodiments, the second correction opening amount ΔTH2 is variably set according to the parameter indicating the operating state of the engine 1. However, the second correction opening amount ΔTH2 may be a fixed value.

The second correction opening amount ΔTH2 may be variably set according to an appropriate parameter other than the parameters indicating the operating state of the engine 1 which are used in the aforementioned embodiments (the engine speed Ne, the engine speed change amount ΔNe, and the correction coefficient difference ΔFAF).

In each of the aforementioned embodiments, the configuration may be changed such that at least one of the first correction opening amount ΔTH1 and the second correction opening amount ΔTH2 is calculated in one of the manners described in the following (1) to (4).

(1) The correspondence relation between the first correction opening amount ΔTH1 (and/or the second correction opening amount ΔTH2), and the engine speed Ne and the engine speed change amount ΔNe is defined in advance, and the first correction opening amount ΔTH1 (and/or the second correction opening amount ΔTH2) is calculated based on the relation.

(2) The correspondence relation between the first correction opening amount ΔTH1 (and/or the second correction opening amount ΔTH2), and the engine speed Ne and the correction coefficient difference ΔFAF is defined in advance, and the first correction opening amount ΔTH1 (and/or the second correction opening amount ΔTH2) is calculated based on the relation.

(3) The correspondence relation between the first correction opening amount ΔTH1 (and/or the second correction opening amount ΔTH2), and the engine speed change amount ΔNe and the correction coefficient difference ΔFAF is defined in advance, and the first correction opening amount ΔTH1 (and/or the second correction opening amount ΔTH2) is calculated based on the relation.

(4) The correspondence relation between the first correction opening amount ΔTH1 (and/or the second correction opening amount ΔTH2), and the engine speed Ne, the engine speed change amount ΔNe, and the correction coefficient difference ΔFAF is defined in advance, and the first correction opening amount ΔTH1 (and/or the second correction opening amount ΔTH2) is calculated based on the relation.

Figure 9:
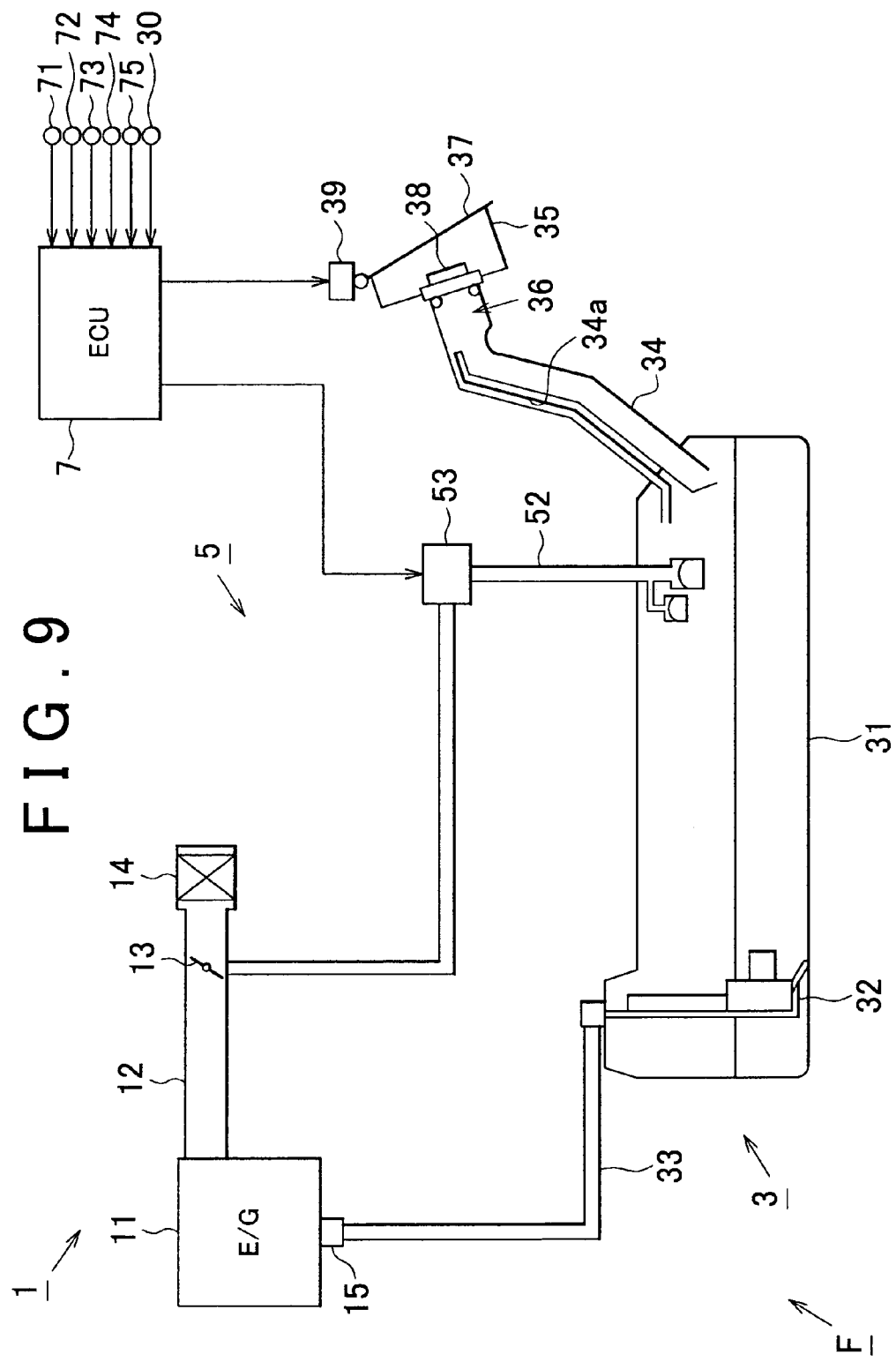
FIG. 9 is a schematic diagram showing an entire configuration of a control apparatus for a sealed fuel tank system according to a second embodiment of the invention.

In the aforementioned embodiments, it is assumed that the sealed fuel tank system F having the configuration shown in FIG. 1 is employed (in the second embodiment, it is assumed that the sealed fuel tank system F having the configuration shown in FIG. 9 is employed). However, a sealed fuel tank system F having a configuration different from the configurations shown in FIG. 1 and FIG. 9 may be employed. In brief, the configuration of the sealed fuel tank system may be appropriately changed as long as leak of vapor to the atmosphere can be prevented by supplying the vapor in the fuel tank to the intake pipe.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for a sealed fuel tank system which is applied to an engine including a throttle valve provided in an intake pipe, and which includes a vaporized fuel supply pipe that connects a fuel tank and the intake pipe, and a control valve that opens and closes the vaporized fuel supply pipe, the control apparatus comprising:
a controller which maintains the control valve in an open state on a condition that a pressure in the fuel tank is equal to or higher than a reference determination pressure; and
corrects an opening amount of the throttle valve to a value equal to a first control opening amount that is smaller than a required opening amount set based on an operating state of the engine by a first correction opening amount when the control valve is in the open state,
wherein the controller monitors a correction coefficient for a command value indicating a fuel injection amount in air-fuel ratio control for the engine, and variably sets the first correction opening amount based on a correspondence relation between an absolute value of a difference between the correction coefficient and a reference value, and the first correction opening amount, which is defined such that the first correction opening amount is decreased with an increase in the absolute value of the difference between the correction coefficient and the reference value.

2. The control apparatus according to claim 1, wherein the controller corrects the opening amount of the throttle valve to the value equal to the first control opening amount by
(i) controlling the opening amount of the throttle valve to a value equal to the required opening amount; and (ii) gradually changing the opening amount of the throttle valve from the value equal to the required opening amount to the value equal to the first control opening amount.

3. The control apparatus according to claim 1, wherein the controller variably sets the first correction opening amount based on the operating state of the engine.

4. The control apparatus according to claim 3, wherein the controller variably sets the first correction opening amount based on a correspondence relation between an engine speed and the first correction opening amount, which is defined such that the first correction opening amount is increased with an increase in the engine speed.

5. The control apparatus according to claim 3, wherein the controller variably sets the first correction opening amount based on a correspondence relation between an amount of change in the engine speed and the first correction opening amount, which is defined such that the first correction opening amount is decreased with an increase in the amount of change in the engine speed.

6. The control apparatus according to claim 1, wherein the controller stops correcting the opening amount of the throttle valve when the pressure in the fuel tank is lower than a predetermined determination pressure that is set to a value larger than the reference determination pressure on a condition that the control valve is in the open state.

7. The control apparatus according to claim 1, wherein the controller corrects the opening amount of the throttle valve to a value equal to a second control opening amount that is larger than the required opening amount by a second correction opening amount when an amount of change in an engine speed is equal to or larger than a predetermined amount of change on a condition that the control valve is in the open state.

8. The control apparatus according to claim 7, wherein the controller corrects the opening amount of the throttle valve to the value equal to the second control opening amount by i) controlling the opening of the throttle valve to a value equal to the required opening amount; and ii) gradually changing the opening amount of the throttle valve from the value equal to the required opening amount to the value equal to the second control opening amount.

9. The control apparatus according to claim 7, wherein the controller variably sets the second correction opening amount based on the operating state of the engine.

10. The control apparatus according to claim 9, wherein the controller variably sets the second correction opening amount based on a correspondence relation between the engine speed and the second correction opening amount, which is defined such that the second correction opening amount is increased with an increase in the engine speed.

11. The control apparatus according to claim 9, wherein the controller variably sets the second correction opening amount based on a correspondence relation between the amount of change in the engine speed and the second correction opening amount, which is defined such that the second correction opening amount is increased with an increase in the amount of change in the engine speed.

12. The control apparatus according to claim 9, wherein the controller monitors a correction coefficient for a command value indicating a fuel injection amount in air-fuel ratio control for the engine, and variably sets the second correction opening amount based on a correspondence relation between a difference between the correction coefficient and a reference value, and the second correction opening amount, which is defined such that the second correction opening amount is increased with an increase in the difference between the correction coefficient and the reference value.

13. A control apparatus for a sealed fuel tank system which is applied to an engine including a throttle valve provided in an intake pipe, and which includes a vaporized fuel supply pipe that connects a fuel tank and the intake pipe, and a control valve that opens and closes the vaporized fuel supply pipe, the control apparatus comprising:

a controller which maintains the control valve in an open state on a condition that a pressure in the fuel tank is equal to or higher than a first reference determination pressure and which monitors a correction coefficient for a command value indicating a fuel injection amount in air-fuel ratio control for the engine and which corrects the opening amount of the throttle valve to a value equal to a second control opening amount that is larger than a required opening amount set based on an operating state of the engine by a second correction opening amount when an absolute value of a difference between the correction coefficient and a reference value is equal to or larger than a predetermined difference on a condition that the control valve is in the open state.

14. The control apparatus according to claim 13, wherein the controller corrects the opening amount of the throttle valve to the value equal to the second control opening amount by (i) controlling the opening amount of the throttle valve to a value equal to the required opening amount; and (ii) gradually changing the opening amount of the throttle valve from the value equal to the required opening amount to the value equal to the second control opening amount.

15. The control apparatus according to claim 13, wherein the controller variably sets the second correction opening amount based on the operating state of the engine.

16. The control apparatus according to claim 15, wherein the controller variably sets the second correction opening amount based on a correspondence relation between an engine speed and the second correction opening amount, which is defined such that the second correction opening amount is increased with an increase in the engine speed.

17. The control apparatus according to claim 15, wherein the controller variably sets the second correction opening amount based on a correspondence relation between an amount of change in an engine speed and the second correction opening amount, which is defined such that the second correction opening amount is increased with an increase in the amount of change in the engine speed.

18. The control apparatus according to claim 15, wherein the controller monitors the correction coefficient for the command value indicating the fuel injection amount in the air-fuel ratio control for the engine, and variably sets the second correction opening amount based on a correspondence relation between the difference between the correction coefficient and the reference value, and the second correction opening amount, which is defined such that the second correction opening amount is increased with an increase in the difference between the correction coefficient and the reference value.

19. The control apparatus of claim 13, wherein the controller corrects the opening amount of the throttle valve to the value equal to the second control opening amount that is larger than the required opening amount by the second correction opening amount when the pressure in the fuel tank is lower than a second predetermined determination pressure that is set to a value larger than the first reference determination pressure on the condition that the control valve is in the open state.

20. A control apparatus for a sealed fuel tank system which is applied to an engine including a throttle valve provided in an intake pipe, and which includes a vaporized fuel supply pipe that connects a fuel tank and the intake pipe, and a control valve that opens and closes the vaporized fuel supply pipe, the control apparatus comprising:

a controller which maintains the control valve in an open state on a condition that a pressure in the fuel tank is equal to or higher than a reference determination pressure and which corrects an opening amount of the throttle valve to a value equal to a first control opening amount that is smaller than a required opening amount set based on an operating state of the engine by a first correction opening amount when the control valve is in the open state and wherein the controller compensates for a decrease in an output of the engine which is caused by correction of the opening amount of the throttle valve to the value equal to the first control opening amount.

21. The control apparatus according to claim 20, wherein the controller uses a motor for driving a hybrid vehicle including the sealed fuel tank system in order to compensate for the decrease in the output of the engine.

22. The control apparatus according to claim 21, wherein the controller prohibits correction of the opening amount of the throttle valve to the value equal to the first control opening amount when a charge amount of a battery in the hybrid vehicle is smaller than a predetermined charge amount.

* * * * *

UNITED STATES PATENT AND TRADEMARK OFFICE
CERTIFICATE OF CORRECTION

PATENT NO. : 7,086,392 B2  
APPLICATION NO. : 10/946607  
DATED : August 8, 2006  
INVENTOR(S) : Naoto Suzuki Page 1 of 1

It is certified that error appears in the above-identified patent and that said Letters Patent is hereby corrected as shown below:

Column      Line 10      37      Change "(Pt>PtX1)" to --(Pt≥PtX1)--.

Signed and Sealed this

Twenty-second Day of May, 2007

JON W. DUDAS  
*Director of the United States Patent and Trademark Office*